US012400285B2

United States Patent
Oda et al.

(10) Patent No.: US 12,400,285 B2
(45) Date of Patent: Aug. 26, 2025

(54) ROBOT SYSTEM, CONTROL METHOD, IMAGE PROCESSING APPARATUS, IMAGE PROCESSING METHOD, METHOD OF MANUFACTURING PRODUCTS, AND RECORDING MEDIUM

(71) Applicant: CANON KABUSHIKI KAISHA, Tokyo (JP)

(72) Inventors: Akihiro Oda, Kanagawa (JP); Taishi Matsumoto, Tokyo (JP); Yuichiro Kudo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 719 days.

(21) Appl. No.: 17/700,554

(22) Filed: Mar. 22, 2022

(65) Prior Publication Data

US 2022/0318942 A1 Oct. 6, 2022

(30) Foreign Application Priority Data

Apr. 6, 2021 (JP) .................................. 2021-064754
Mar. 4, 2022 (JP) .................................. 2022-033167

(51) Int. Cl.
*G06T 1/00* (2006.01)
*B25J 9/16* (2006.01)
(Continued)

(52) U.S. Cl.
CPC ........... *G06T 1/0014* (2013.01); *B25J 9/1612* (2013.01); *B25J 9/1697* (2013.01); *B25J 13/08* (2013.01);
(Continued)

(58) Field of Classification Search
CPC ............... G06T 1/0014; G06T 7/70; G06T 2207/20081; G06T 2207/20084;
(Continued)

(56) References Cited

U.S. PATENT DOCUMENTS

| 5,321,502 | A | 6/1994 | Matsumoto et al. |
| 5,818,588 | A | 10/1998 | Matsumoto et al. |

(Continued)

FOREIGN PATENT DOCUMENTS

| JP | 2000-293695 A | 10/2000 |
| JP | 2017-030115 A | 2/2017 |

(Continued)

OTHER PUBLICATIONS

Dec. 12, 2022 Extended European Search Report in European Application No. 22 16 2954.6.

(Continued)

*Primary Examiner* — Christopher M Brandt
(74) *Attorney, Agent, or Firm* — Venable LLP

(57) ABSTRACT

A robot system includes a robot, an image capture apparatus, an image processing portion, and a control portion. The image processing portion is configured to specify in an image of a plurality of objects captured by the image capture apparatus, at least one area in which a predetermined object having a predetermined posture exists, and obtain information on position and/or posture of the predetermined object in the area. The control portion is configured to control the robot, based on the information on position and/or posture of the predetermined object, for the robot to hold the predetermined object.

28 Claims, 21 Drawing Sheets

(51) Int. Cl.
*B25J 13/08* (2006.01)
*G06T 7/70* (2017.01)

(52) U.S. Cl.
CPC ...... *G06T 7/70* (2017.01); *G06T 2207/20081* (2013.01)

(58) Field of Classification Search
CPC ........... G06T 2207/30164; G06T 7/593; G06T 2207/10024; G06T 7/73; B25J 9/1612; B25J 9/1697; B25J 13/08; B25J 9/161; B25J 9/163; B25J 9/16; B25J 9/0081; B25J 9/1664; B25J 9/1671; B25J 9/1679; B25J 19/023; B25J 9/1602; B25J 9/1653; B25J 15/0658; B25J 9/1687; B25J 11/0045; B25J 13/06; B25J 9/0093; B25J 11/009; B25J 13/00; B25J 13/081; B25J 13/086; B25J 13/089; B25J 15/0028; B25J 15/0616; B25J 15/08; B25J 19/021; B25J 19/027; B25J 19/04; B25J 9/0009; B25J 9/042; B25J 9/162; B25J 9/1666; B25J 9/1676; B25J 9/1684; B25J 9/1689; G05B 2219/39369; G05B 2219/39543; G05B 2219/40053; G05B 2219/40532; G05B 2219/40564; G05B 2219/40604; G05B 2219/39514; G05B 2219/40584; G05B 2219/40014; G05B 2219/45063; G05B 2219/39508; G05B 2219/39558; G05B 2219/40497; G06V 20/20; G06V 20/58; G06V 20/653; G06V 2201/07; G06V 10/776; G06V 20/10; G06V 2201/06; G06N 20/00; G06N 3/045; G06N 3/08; G06N 3/047; B01L 2300/0825; B01L 3/5023; G01N 33/54386; G01N 33/558; G01N 33/56983; G01N 33/533; G01N 33/54388; G01N 33/582; B33Y 70/10; C07C 265/12; C07C 267/00; C08F 2/50; C08F 220/28; C08F 222/1065; C08K 7/14; A61M 5/20; A61M 5/30; A61M 5/427

See application file for complete search history.

(56) References Cited

U.S. PATENT DOCUMENTS

| | | | |
|---|---|---|---|
| 7,084,900 | B1 | 8/2006 | Watanabe et al. |
| 9,802,317 | B1 | 10/2017 | Watts et al. |
| 10,363,664 | B2 | 7/2019 | Yoshii |
| 2017/0032177 | A1* | 2/2017 | Suenaga .................. G06T 7/74 |
| 2017/0154430 | A1 | 6/2017 | Yoshii |
| 2018/0281200 | A1 | 10/2018 | Rosenstein et al. |
| 2019/0329409 | A1* | 10/2019 | Yamada ................ B25J 9/1661 |
| 2020/0311854 | A1* | 10/2020 | Toda ..................... B25J 9/1671 |
| 2020/0368923 | A1 | 11/2020 | Tsukui |
| 2021/0069903 | A1 | 3/2021 | Duan et al. |
| 2021/0069904 | A1* | 3/2021 | Duan ...................... B25J 9/161 |
| 2022/0241982 | A1* | 8/2022 | Oishi ....................... G06T 7/50 |

FOREIGN PATENT DOCUMENTS

| | | |
|---|---|---|
| JP | 2017-100216 A | 6/2017 |
| WO | 2021/053750 A1 | 3/2021 |

OTHER PUBLICATIONS

Aug. 26, 2022 Communication in European Patent Application No. 22 16 2954.6.

Feb. 27, 2025 Office Action in Chinese Patent Application No. 202210349718.6 (with English translation).

* cited by examiner

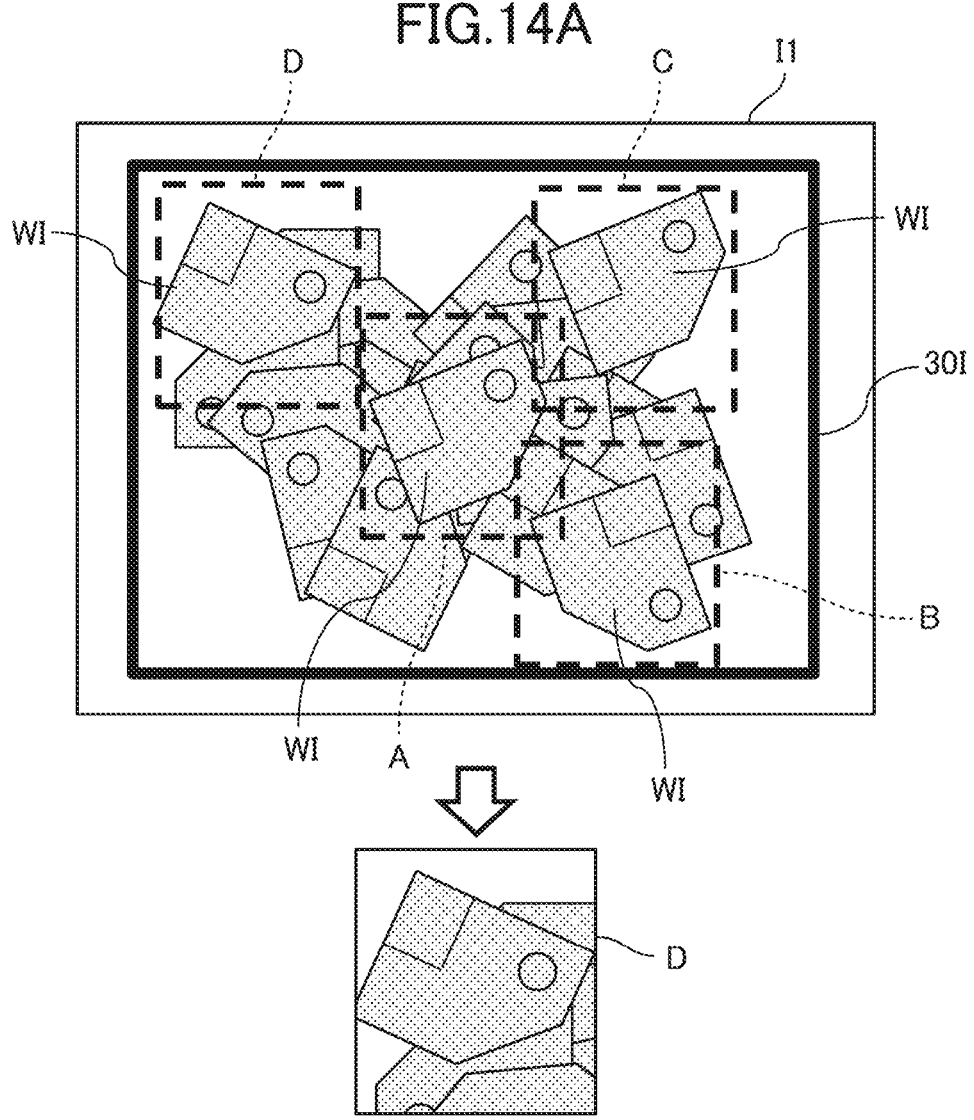
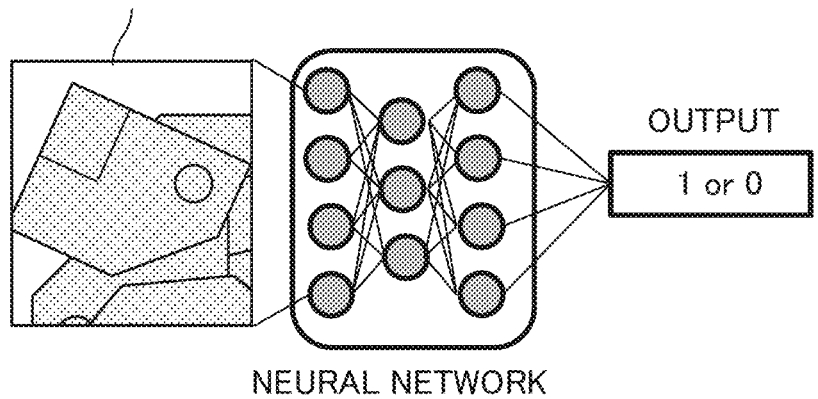

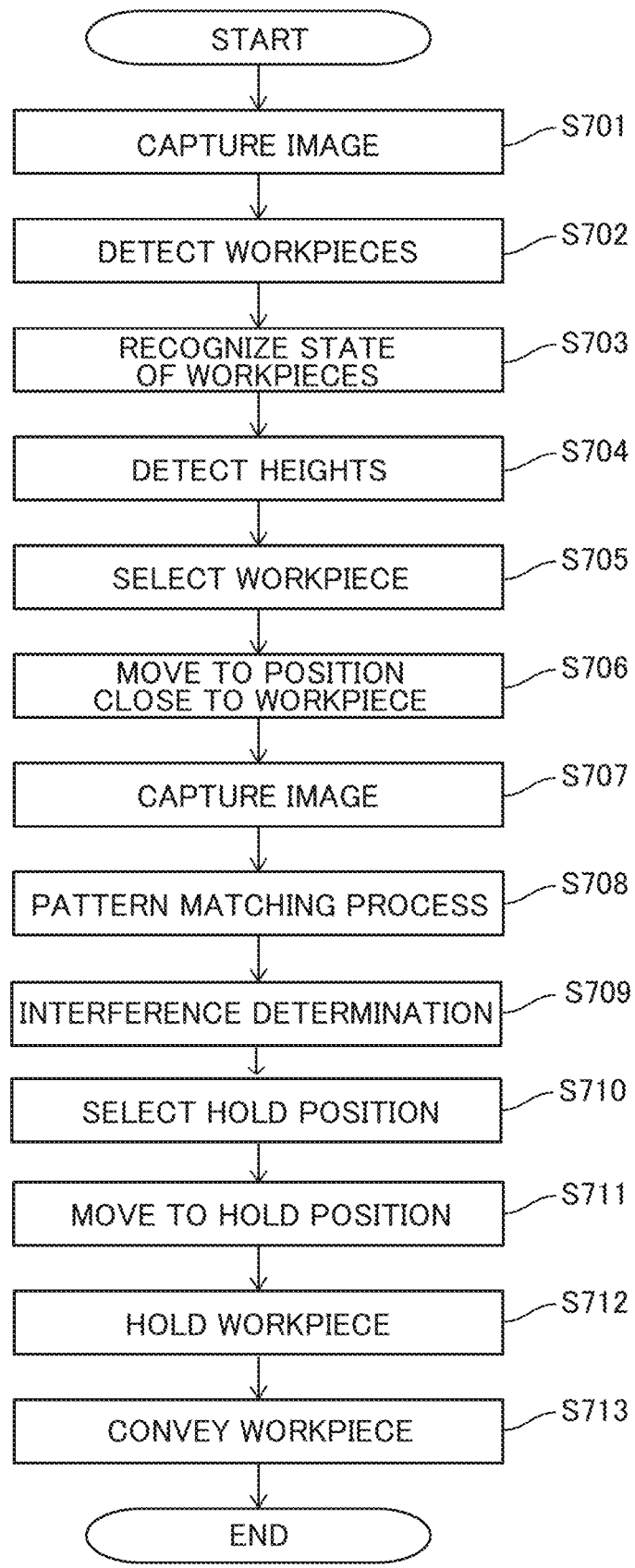

● DOTS THAT INDICATE OBTAINED HEIGHT INFORMATION

ROBOT SYSTEM, CONTROL METHOD, IMAGE PROCESSING APPARATUS, IMAGE PROCESSING METHOD, METHOD OF MANUFACTURING PRODUCTS, AND RECORDING MEDIUM

BACKGROUND OF THE INVENTION

Field of the Invention

The present disclosure relates to image processing.

Description of the Related Art

In a factory, kitting work in which a workpiece is placed in a predetermined position, and assembly work in which a product is assembled by fitting or inserting a workpiece into another workpiece are performed, for example. In these types of work, industrial robots are used for automating the factory. These types of work include picking work in which a workpiece is picked out, one by one, from among a plurality of workpieces stacked in bulk.

Japanese Patent Application Publication No. 2000-293695 describes a technique in which an image of a plurality of workpieces stacked in bulk is captured by a camera, and image processing such as pattern matching is performed. In the pattern matching, the captured image and a teach model obtained in advance are compared with each other.

SUMMARY OF THE INVENTION

According to a first aspect of the present invention, a robot system includes a robot, an image capture apparatus, an image processing portion, and a control portion. The image processing portion is configured to specify, in an image of a plurality of objects captured by the image capture apparatus, at least one area in which a predetermined object having a predetermined posture exists, and obtain information on position and/or posture of the predetermined object in the area. The control portion is configured to control the robot, based on the information on position and/or posture of the predetermined object, for the robot to hold the predetermined object.

According to a second aspect of the present invention, a control method of a robot system that includes a robot and an image capture apparatus includes specifying, by an image processing portion, in an image of a plurality of objects captured by the image capture apparatus, at least one area in which a predetermined object having a predetermined posture exists, and obtaining, by the image processing portion, information on position and/or posture of the predetermined object in the area, and controlling, by a control portion, the robot, based on the information on position and/or posture of the object, for the robot to hold the predetermined object.

According to a third aspect of the present invention, an image processing apparatus includes an image processing portion configured to specify in a captured image of a plurality of objects, at least one area in which a predetermined object having a predetermined posture exists, and obtain information on position and/or posture of the predetermined object in the area.

According to a fourth aspect of the present invention, an image processing method includes specifying, by an image processing portion, in a captured image of a plurality of objects, at least one area in which a predetermined object having a predetermined posture exists, and obtaining, by the image processing portion, information on position and/or posture of the predetermined object in the area.

Further features of the present invention will become apparent from the following description of exemplary embodiments with reference to the attached drawings.

BRIEF DESCRIPTION OF THE DRAWINGS

FIG. 14A is a schematic diagram for illustrating a trimming process of the third embodiment.

FIG. 14B is a schematic diagram for illustrating a learned model of the third embodiment.

FIG. 19 is a flowchart illustrating a control method of a robot of a seventh embodiment.

DESCRIPTION OF THE EMBODIMENTS

In the conventional method, the image processing for recognizing a workpiece takes time. For this reason, it has been desired to shorten the time required for the image processing performed for recognizing a workpiece, for improving productivity of products in a production line.

An object of the present disclosure is to shorten the time required for the image processing performed for recognizing a workpiece.

Hereinafter, some embodiments of the present invention will be described in detail with reference to the accompanying drawings.

First Embodiment

Figure 1:
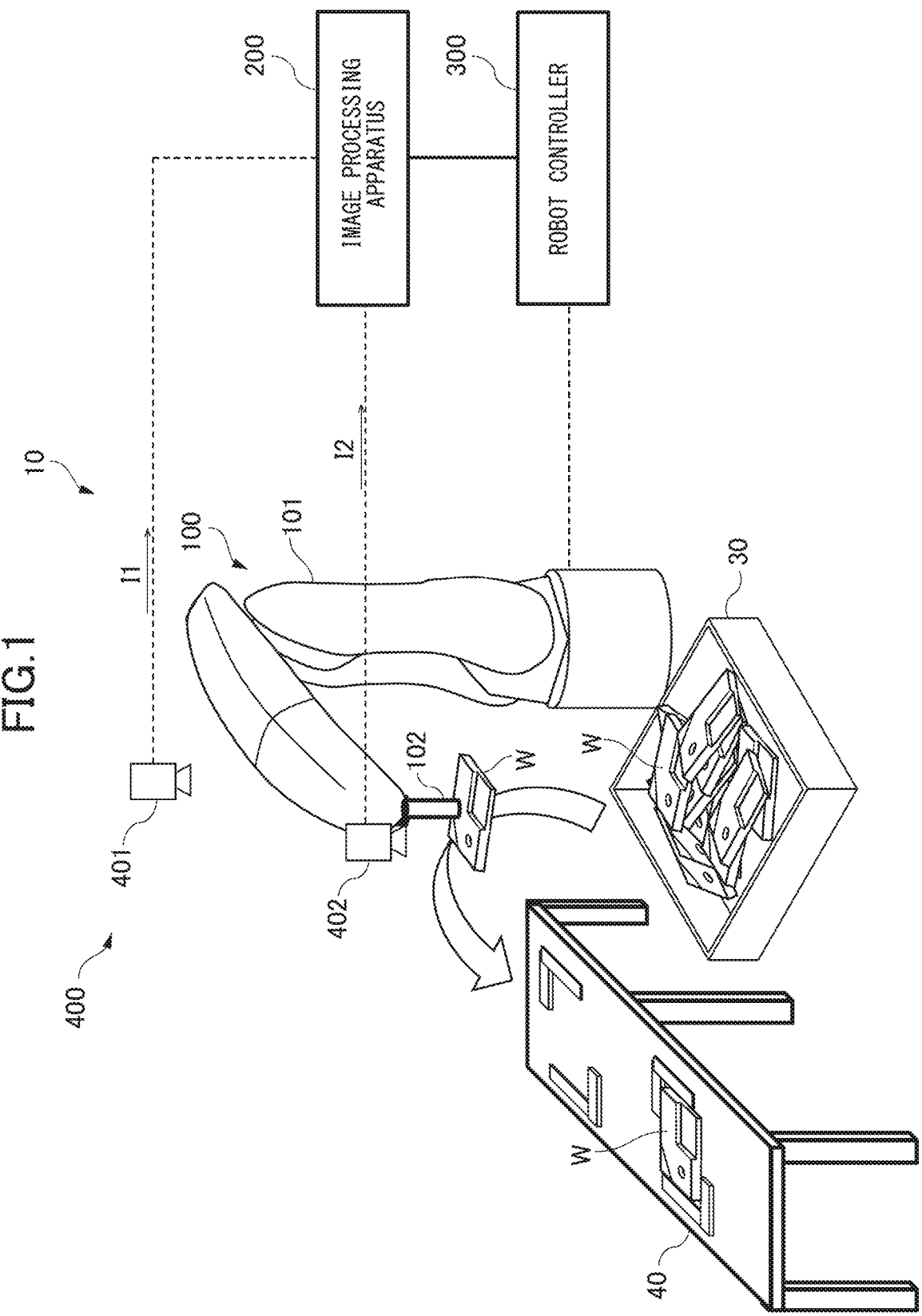
FIG. 1 is a diagram illustrating a schematic configuration of a robot system of a first embodiment.

FIG. 1 is a diagram illustrating a schematic configuration of a robot system 10 of a first embodiment. The robot system 10 includes a robot 100, an image processing apparatus 200, a robot controller 300 that is one example of a control apparatus, and an image capture system 400 that is one example of an image capture apparatus. The robot 100 is an industrial robot, and is disposed in a production line and used for manufacturing products.

The robot 100 is a manipulator. The robot 100 is fixed to a base stand, for example. Around the robot 100, a container 30 whose upper portion is open, and a stand 40 are disposed. In the container 30, a plurality of workpieces W are stacked in bulk. Each workpiece W is one example of objects; and is a part, for example. The plurality of workpieces W in the container 30 are to be held by the robot 100 one by one, and conveyed to a predetermined position on the stand 40. The plurality of workpieces W has an identical shape, an identical size, and an identical color; and is disposed at random in the container 30. Each workpiece W is a plate-like member, and has a front surface and a back surface whose shapes are different from each other.

The robot 100 and the robot controller 300 are communicatively connected with each other. The robot controller 300 and the image processing apparatus 200 are communicatively connected with each other. The image capture system 400 and the image processing apparatus 200 are communicatively connected with each other, via wire or wirelessly.

The robot 100 includes a robot arm 101, and a robot hand 102 that is one example of end effectors or holding mechanisms. The robot arm 101 is a vertically articulated robot arm. The robot hand 102 is supported by the robot arm 101. The robot hand 102 is attached to a predetermined portion of the robot arm 101, such as a distal end portion of the robot arm 101. The robot hand 102 can hold the workpiece W.

Note that although the description will be made for a case where the holding mechanism is the robot hand 102, the present disclosure is not limited to this. For example, the holding mechanism may be a sucking mechanism that holds the workpiece W by sucking the workpiece W. In the first embodiment, the robot hand 102 can hold the workpiece W.

In the above-described configuration, the robot hand 102 is moved to a predetermined position by the robot arm 101, so that the robot 100 can perform desired work. For example, a workpiece W and another workpiece are prepared as materials, and the workpiece W is assembled to the other workpiece by the robot 100, for manufacturing an assembled workpiece as a product. In this manner, the product can be manufactured by the robot 100. Note that although the description has been made as an example in the present embodiment, for the case where a product is manufactured by the robot 100 assembling one workpiece to another workpiece, the present disclosure is not limited to this. For example, a product may be manufactured by attaching a tool, such as a cutting tool or a grinding tool, to the robot arm 101, and by causing the tool to machine a workpiece.

The image capture system 400 includes a camera 401 that is one example of a first image-capture unit, and a camera 402 that is one example of a second image-capture unit. Each of the cameras 401 and 402 is a digital camera. The camera 401 is fixed to a frame (not illustrated). The camera 401 is positioned at a position at which the camera 401 can capture an image of an area that contains the plurality of workpieces W disposed in the container 30. That is, the camera 401 can capture an image of an area that contains the workpieces W, which are objects to be held by the robot 100.

The camera 402 is attached to a predetermined portion of the robot 100, such as the robot hand 102, and thereby is supported by the robot 100. The position of the camera 402 at which the camera 402 captures images, that is, an image capture area whose image is captured by the camera 402 can be freely changed in accordance with the posture of the robot 100. Specifically, by the motion of the robot 100, the camera 402 can be moved to a position closer to the plurality of workpieces W stacked in bulk in the container 30, than the position of the camera 401 is. Thus, the camera 402 can capture an image of an area smaller than the area whose image is captured by the camera 401. In addition, by the motion of the robot 100, the camera 402 can be moved to a position above a workpiece W of the plurality of workpieces W, which is an object to be held by the robot 100.

Figure 2:
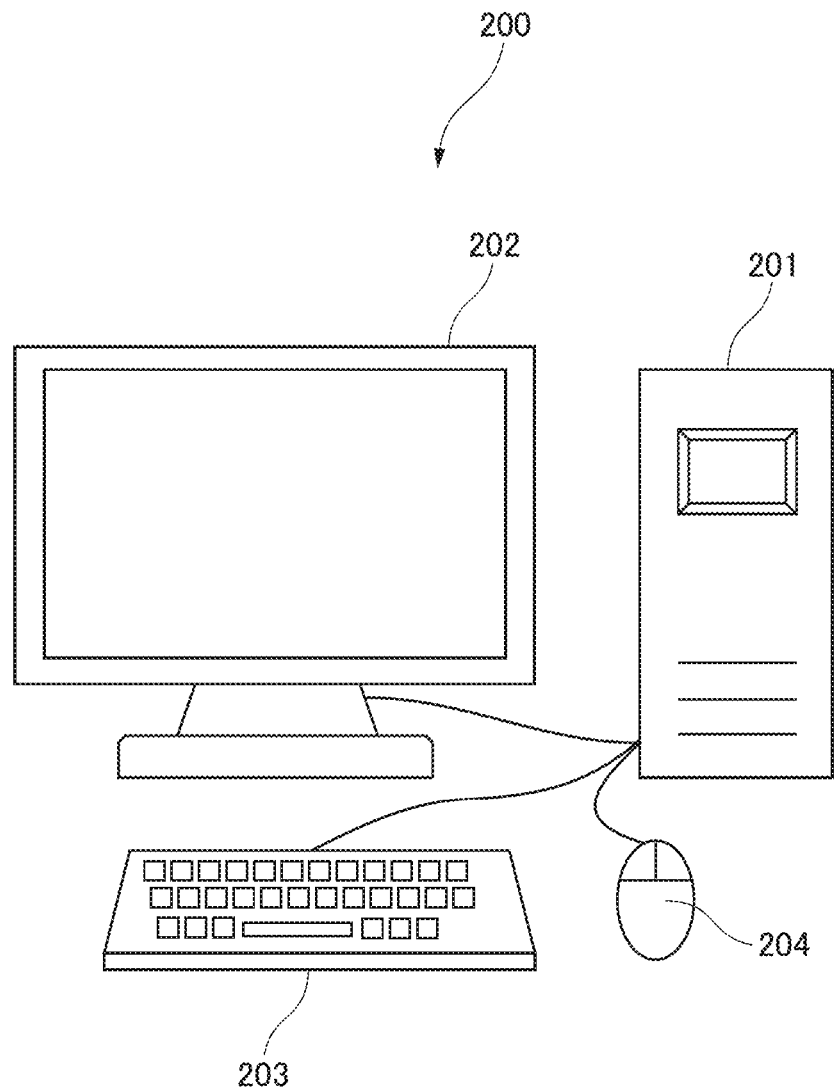
FIG. 2 is a diagram illustrating an image processing apparatus of the first embodiment.

In the first embodiment, the image processing apparatus 200 is a computer. The image processing apparatus 200 sends an image capture command to the camera 401, and causes the camera 401 to capture an image. In addition, the image processing apparatus 200 sends an image capture command to the camera 402, and causes the camera 402 to capture an image. The image processing apparatus 200 obtains an image I1 that is one example of a first image captured by the camera 401, and processes the image I1. In addition, the image processing apparatus 200 obtains an image I2 that is one example of a second image captured by the camera 402, and processes the image I2. FIG. 2 is a diagram illustrating the image processing apparatus 200 of the first embodiment. The image processing apparatus 200 includes a main body 201, a display 202 that is one example of a display connected to the main body 201, and a keyboard 203 and a mouse 204 that are one example of input devices connected to the main body 201.

In the first embodiment, the robot controller 300 illustrated in FIG. 1 is a computer. The robot controller 300 controls the motion of the robot 100, that is, the posture of the robot 100.

Figure 3:
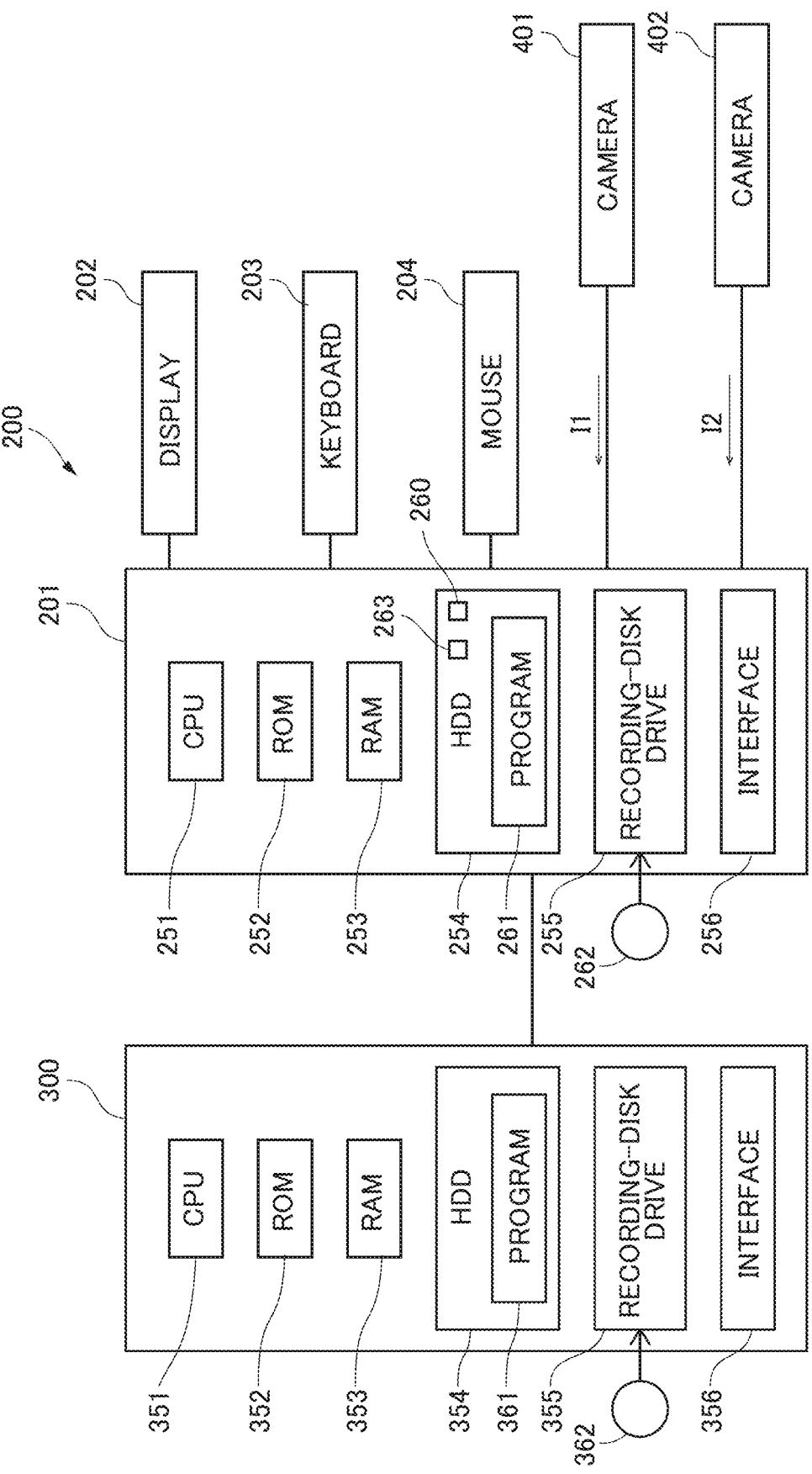
FIG. 3 is a block diagram of a computer system of the robot system of the first embodiment.

FIG. 3 is a block diagram of a computer system of the robot system 10 of the first embodiment. The main body 201 of the image processing apparatus 200 includes a central processing unit (CPU) 251, which is one example of a processor. The CPU 251 is one example of an image processing portion. The main body 201 also includes a read only memory (ROM) 252, a random access memory (RAM) 253, and a hard disk drive (HDD) 254, which serve as a storage portion. The main body 201 also includes a recording-disk drive 255, and an interface 256 that is an input/output interface. The CPU 251, the ROM 252, the RAM 253, the HDD 254, the recording-disk drive 255, and the interface 256 are communicatively connected with each other via a bus.

The ROM 252 stores a base program related to the operation of the computer. The RAM 253 is a storage device that temporarily stores various types of data, such as results of a computing process performed by the CPU 251. The HDD 254 stores various types of data, such as results of a computing process performed by the CPU 251 and data obtained from an external device, and a program 261 that causes the CPU 251 to execute various types of process. The program 261 is application software that can be executed by the CPU 251.

The CPU 251 executes the later-described image processing by executing the program 261 stored in the HDD 254. The recording-disk drive 255 reads various types of data and a program stored in a recording disk 262.

In the first embodiment, the HDD 254 is a computer-readable non-transitory recording medium, and stores the program 261. However, the present disclosure is not limited to this. The program 261 may be recorded in any recording medium as long as the recording medium is a computer-readable non-transitory recording medium. For example, a flexible disk, a hard disk, an optical disk, a magneto-optical disk, a magnetic tape, a nonvolatile memory, or the like may be used as the recording medium that provides the program 261 to the computer.

The robot controller 300 includes a CPU 351 that is one example of a processor. The CPU 351 is one example of a control portion. The robot controller 300 also includes a ROM 352, a RAM 353, and an HDD 354, which serve as a storage portion. The robot controller 300 also includes a recording-disk drive 355, and an interface 356 that is an input/output interface. The CPU 351, the ROM 352, the RAM 353, the HDD 354, the recording-disk drive 355, and the interface 356 are communicatively connected with each other via a bus.

The ROM 352 stores a base program related to the operation of the computer. The RAM 353 is a storage device that temporarily stores various types of data, such as results of a computing process performed by the CPU 351. The HDD 354 stores various types of data, such as results of a computing process performed by the CPU 351 and data obtained from an external device, and a program 361 that causes the CPU 351 to execute various types of process (that is, the program 361 is recorded in the HDD 354). The program 361 is application software that can be executed by the CPU 351.

The CPU 351 executes the control process by executing the program 361 stored in the HDD 354, and thereby controls the motion of the robot 100 illustrated in FIG. 1.

The recording-disk drive 355 reads various types of data and a program stored in a recording disk 362.

In the first embodiment, the HDD 354 is a computer-readable non-transitory recording medium, and stores the program 361. However, the present disclosure is not limited to this. The program 361 may be recorded in any recording medium as long as the recording medium is a computer-readable non-transitory recording medium. For example, a flexible disk, a hard disk, an optical disk, a magneto-optical disk, a magnetic tape, a nonvolatile memory, or the like may be used as the recording medium that provides the program 361 to the computer.

Note that although the image processing and the control process are executed by a plurality of computers (i.e., CPUs 251 and 351) in the first embodiment, the present disclosure is not limited to this. For example, the image processing and the control process may be executed by a single computer (i.e., a single CPU). In this case, a single CPU may function as the image processing portion and the control portion.

The CPU 251 executes the program 261, and thereby causes the camera 401 to capture an image of an area in which the plurality of workpieces W exists, and detects a workpiece W that can be picked, by using the image I1 captured by the camera 401. That is, the CPU 251 specifies an area of the image I1 that contains a workpiece image corresponding to a workpiece W that can be picked. Hereinafter, the area is referred to as a search area. In addition, the CPU 251 executes the program 261, and thereby causes the camera 402 to capture an image of a real-space area corresponding to the search area. Then, the CPU 251 measures the position and posture of the workpiece W by performing a pattern matching process, which is one example of image processing.

The CPU 351 executes the program 361, and thereby moves the camera 402, by controlling the robot 100, to a position at which the camera 402 can capture an image of the real-space area corresponding to the search area. In addition, the CPU 351 executes the program 361, and thereby moves the robot hand 102 to a position of a workpiece W which has been measured by the CPU 251, and at which the robot hand 102 will hold the workpiece W. In addition, the CPU 351 executes the program 361, and thereby causes the robot hand 102 to hold the workpiece W and move the workpiece W to the stand 40.

Figure 4A:
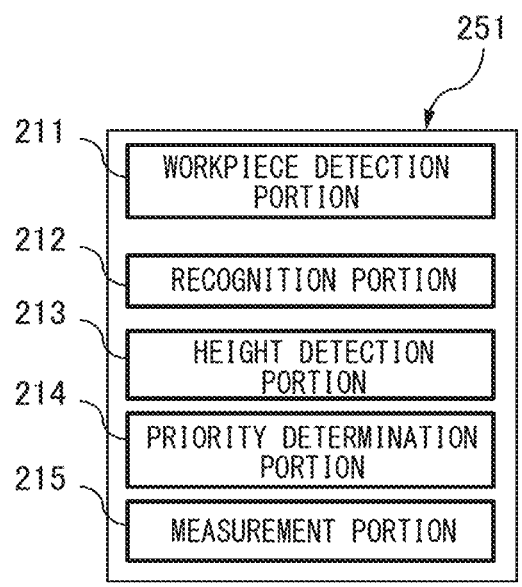
FIG. 4A is a block diagram illustrating functions of a CPU of the first embodiment.

FIG. 4A is a block diagram illustrating functions of the CPU 251 of the first embodiment. The CPU 251 functions as a workpiece detection portion 211, a recognition portion 212, a height detection portion 213, a priority determination portion 214, and a measurement portion 215, by executing the program 261. Next, outlines of operations of the cameras 401 and 402 and the portions 211 to 215 will be described.

The camera 401 captures an image of an area in which a plurality of workpieces W exists, and outputs the image as an RGB grayscale image I1. Note that although the first image-capture unit is the camera 401 in the first embodiment, the present disclosure is not limited to this. The first image-capture unit may be any unit as long as the unit can digitally convert the features of the workpieces W into numerical values.

Figure 4B:
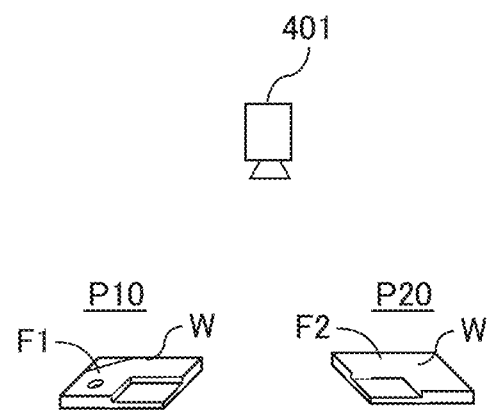
FIG. 4B is a schematic diagram for illustrating a state of a workpiece.

The workpiece detection portion 211 detects from the image I1 obtained from the camera 401, at least one candidate area each containing an image (i.e., workpiece image) of a single workpiece W. The recognition portion 212 recognizes a state of the workpiece W corresponding to the candidate area detected by the workpiece detection portion 211. The state of the workpiece W means posture information of the workpiece W. FIG. 4B is a schematic diagram for illustrating a state of the workpiece W. As illustrated in FIG. 4B, the state of the workpiece W, that is, the posture information of the workpiece W is information that indicates which one of a front surface F1 and a back surface F2 of the workpiece W faces upward when viewed from the camera 401. The front surface F1 is one example of a first surface, and the back surface F2 is one example of a second surface different from the first surface. The shape of the back surface F2 is different from the shape of the front surface F1.

In a case where the at least one candidate area is two or more candidate areas, the height detection portion 213 detects the heights of workpieces W corresponding to workpiece images contained in the candidate areas. The heights of the workpieces W are heights with respect to a reference position in the vertical direction. For example, the height detection portion 213 uses a sensor (not illustrated) that outputs a signal corresponding to a height of a workpiece W; and detects the height of the workpiece W, depending on the signal from the sensor. The sensor (not illustrated) may be a ToF (time of flight) height sensor, or a depth sensor that outputs a distance image. In another case, the height detection portion 213 may detect the heights of the workpieces W by using a three-dimensional camera (not illustrated) that outputs an RGB image and a 3D point group. In this case, the three-dimensional camera may be integrated with the camera 401. The priority determination portion 214 assigns priorities to the plurality of candidate areas detected by the workpiece detection portion 211, in the order of easiness for the robot 100 to pick the workpiece; and extracts a candidate area with a top priority. Thus, the candidate area with the top priority is the above-described search area. In addition, a workpiece W that corresponds to a workpiece image contained in the search area is an object to be held by the robot 100. The object held by the robot 100 is one example of a predetermined object.

The camera 402 captures an image of an area that contains a workpiece W corresponding to a workpiece image contained in the search area of the image I1, and that is smaller than the image capture area of the camera 401. The image I2 captured by the camera 402 is an RGB grayscale image, for example. In addition to the image I2, the camera 402 outputs a distance image, if necessary, that contains height information.

The measurement portion 215 performs the pattern matching process on the image I2 obtained from the camera 402, and thereby obtains three-dimensional information on the position and posture of the workpiece W. Specifically, the measurement portion 215 performs the pattern matching process, based on the posture information of the workpiece W determined by the recognition portion 212. Thus, the amount of calculation can be reduced.

Figure 5:
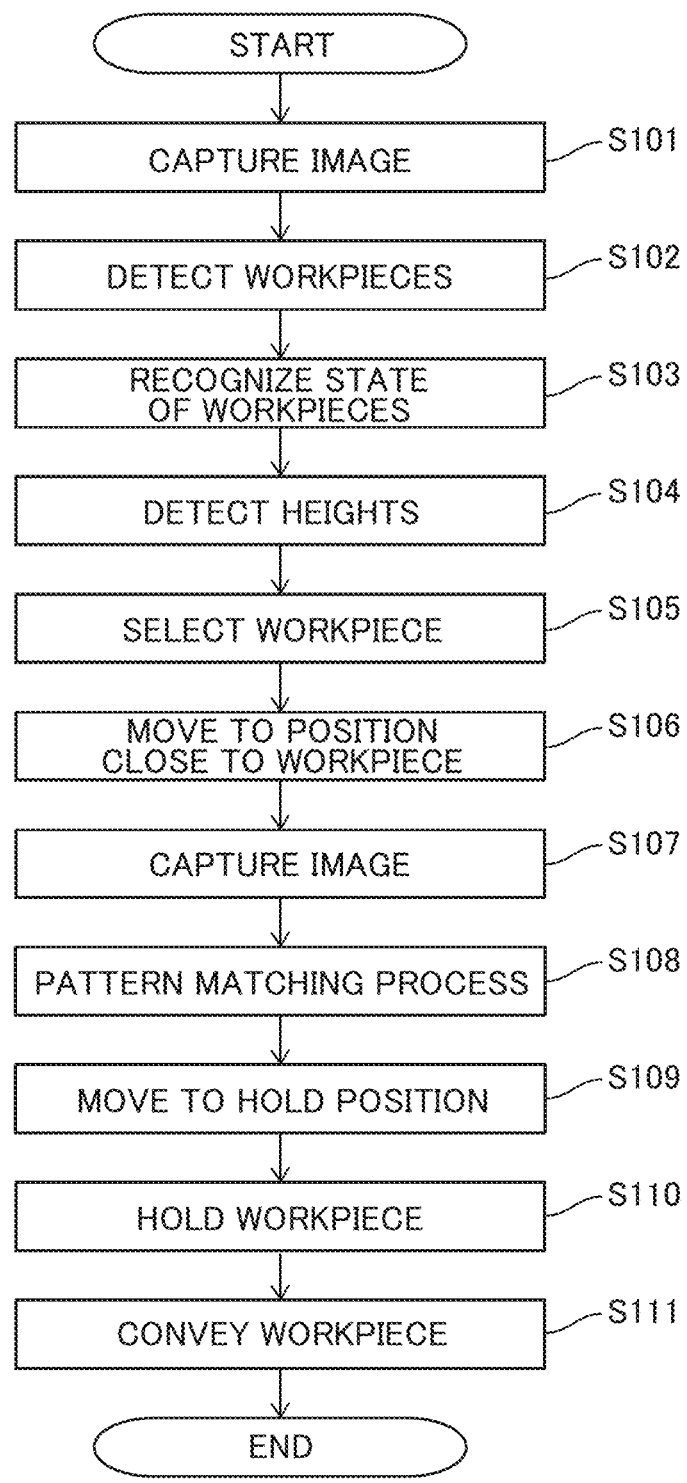
FIG. 5 is a flowchart illustrating a control method of a robot of the first embodiment.

Hereinafter, a control method of the robot 100 that includes an image processing method of the first embodiment will be specifically described. FIG. 5 is a flowchart illustrating a control method of the robot 100 of the first embodiment.

The workpiece detection portion 211 sends an image capture command to the camera 401, and causes the camera 401 to capture an image of an area that contains a plurality of workpieces W (S101). In this operation, the camera 401 captures an image of the plurality of workpieces W stacked in bulk in the container 30. In the plurality of workpieces W, an object to be held by the robot 100 is included. The workpiece detection portion 211 obtains the image I1 that contains an image of the plurality of workpieces W, from the camera 401.

Figure 6A:
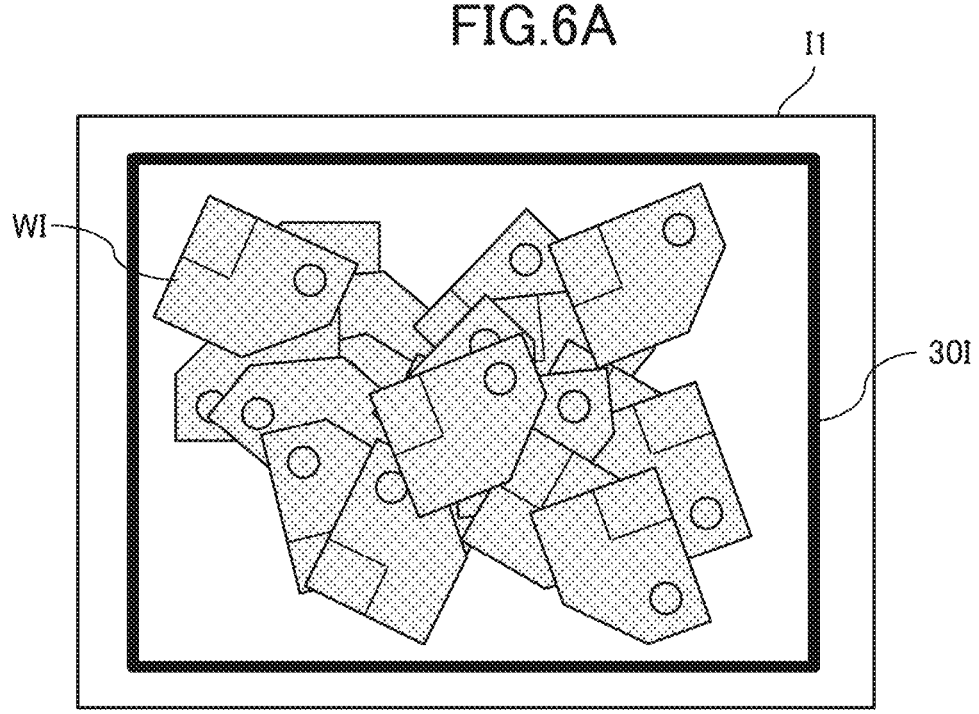
FIG. 6A is a schematic diagram illustrating one example of an image of the first embodiment.

FIG. 6A is a schematic diagram illustrating one example of the image I1 of the first embodiment. As illustrated in FIG. 6A, the image I1 contains a plurality of workpiece images WI, as grayscale images, that corresponds to the plurality of workpieces W stacked in bulk. Note that the Image I1 may contain an image of an object other than the workpieces W, such as the container 30 that contains the workpieces W. In the example of FIG. 6A, the image I1 contains an image 301 that corresponds to the container 30.

Figure 6B:
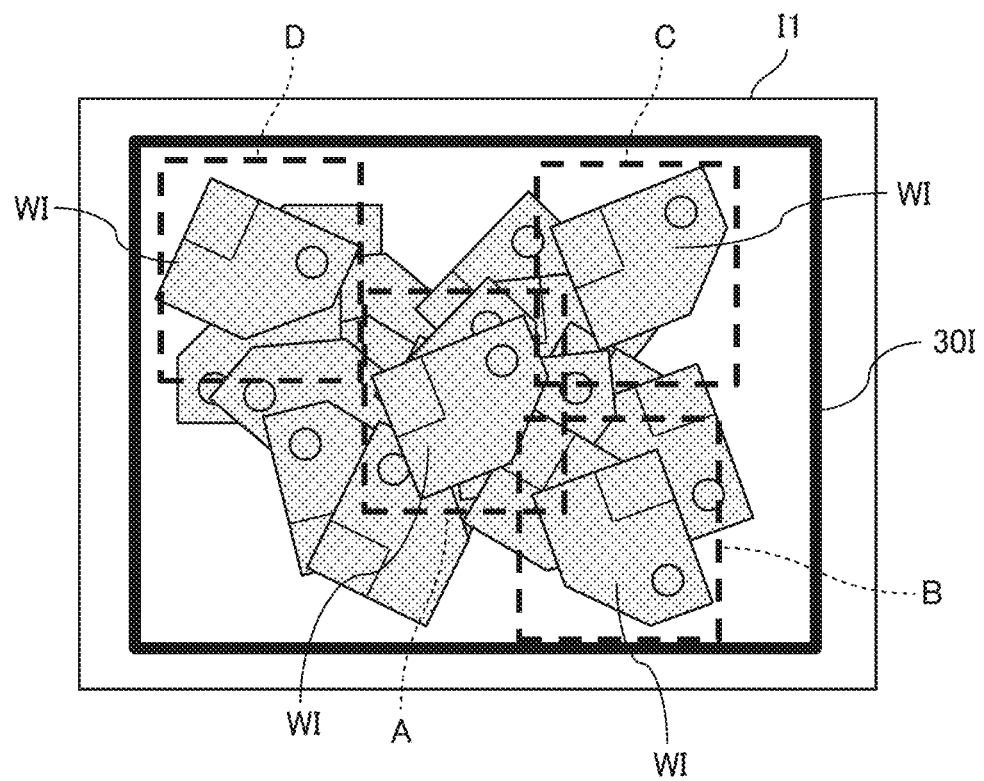
FIG. 6B is a schematic diagram for illustrating a detection process of the first embodiment.

Then, the workpiece detection portion 211 performs a detection process that detects workpieces W from the image I1 (S102). FIG. 6B is a schematic diagram for illustrating the detection process of the first embodiment. As illustrated in FIG. 6B, if the detection process for workpieces W succeeds, two or more areas are obtained in the image I1. In FIG. 6B, four candidate areas A, B, C, and D enclosed by broken lines are obtained in the image I1, for example. Each of the candidate areas A, B, C, and D is a rectangular area that encloses a single workpiece image WI. Each of the candidate areas A, B, C, and D contains a single workpiece image WI, and is associated with posture information of a workpiece W corresponding to the workpiece image WI. Thus, in Step S102, the workpiece detection portion 211 detects the two or more candidate areas A to D, and thereby extracts two or more workpiece images WI from the image I1.

Note that the image I1 contains an image of the plurality of workpieces W stacked in bulk and has a large image capture area. Thus, it takes time for extracting a workpiece W, which is an object to be held by the robot 100, by using the pattern matching process. For this reason, in the first embodiment, the candidate areas A to D are detected by using a process other than the pattern matching process. Specifically, an image recognition method called object detection is used for detecting the candidate areas A to D. In the first embodiment, a learning-based image recognition method that uses deep learning will be described as an example.

In the object detection, the workpiece detection portion 211 uses a learned model 263; and searches in the image I1, for a workpiece image WI corresponding to a workpiece W. The workpiece detection portion 211 then outputs the rectangular candidate areas A to D, each of which encloses a corresponding workpiece image WI. Thus, each of the candidate areas A to D contains a workpiece image WI corresponding to a workpiece W that has a predetermined posture. That is, the workpiece detection portion 211 specifies the candidate areas A to D in the image I1, in each of which a workpiece image WI, which corresponds to a workpiece W that has a predetermined posture, is formed. In the first embodiment, the predetermined posture is a posture P10 or P20. As illustrated in FIG. 4B, the posture P10 is a first posture in which an image of a front surface F1 of a workpiece W is captured, and the posture P20 is a second posture in which an image of a back surface F2 of a workpiece W is captured. Thus, each of the candidate areas A to D contains a workpiece image WI corresponding to a workpiece W that has the posture P10 or P20.

Figure 7A:
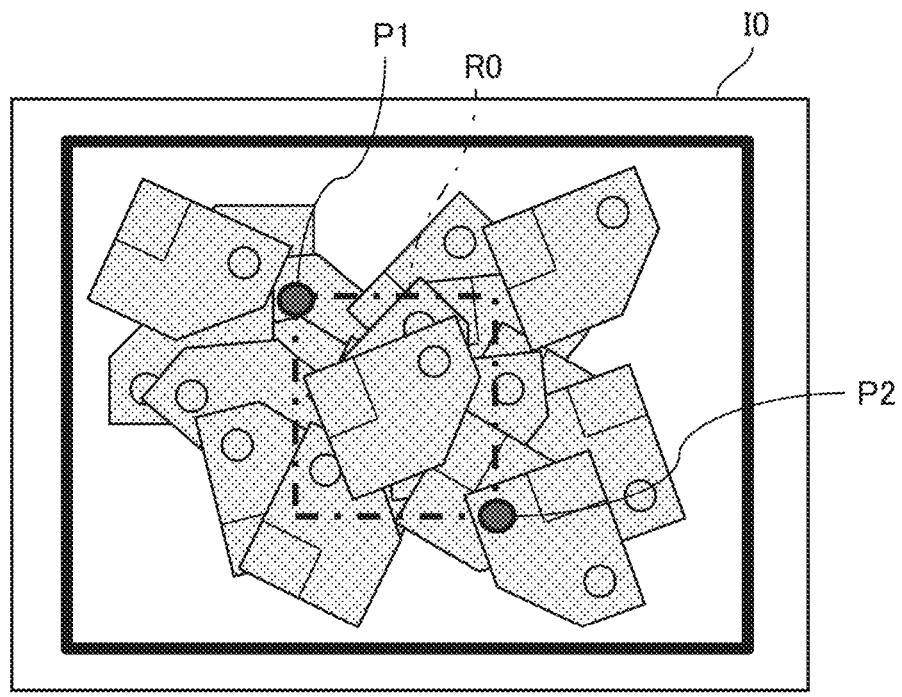
FIG. 7A is a diagram illustrating tagging work of the first embodiment.

For searching for a workpiece W by using the deep learning, it is necessary to teach the robot the features of images of the workpieces W captured by the camera 401. In the teaching, a plurality of learning data sets, each including input data and output data, are prepared. For the input data, raw grayscale images are used; and for the output data, grayscale images and tagged data are used. Each piece of tagged data is data in which a grayscale image is provided with corresponding tag information. The tagging work is performed by an operator. FIG. 7A is a diagram illustrating the tagging work of the first embodiment. In the teaching, many grayscale images I0 are prepared. FIG. 7A illustrates one of the grayscale images I0. Note that the images I0 of the first embodiment are obtained by capturing images of objects that have a shape corresponding to a workpiece W to be held by the robot hand 102. Hereinafter, objects used for the teaching are referred to also as workpieces W, and images contained in the images I0 and corresponding to the objects are referred to also as workpiece images WI.

An operator specifies a rectangular area R0 that encloses a workpiece image WI included in the image I0, and associates the area R0 with information that indicates the state of a corresponding workpiece W. The area R0 is one portion of the image I0. The area R0 is specified by using start-point coordinates P1 and end-point coordinates P2. That is, a rectangular area having opposite corners specified by the start-point coordinates P1 and the end-point coordinates P2 is specified as the area R0. The information that indicates the state of a workpiece W is posture information of the workpiece W that has a defined range. For example, the information that indicates the state of the workpiece W is information that indicates the front surface F1 or the back surface F2 of the workpiece W. The information that indicates the state of the workpiece W is provided to the area R0, associated with the area R0.

Figure 7B:
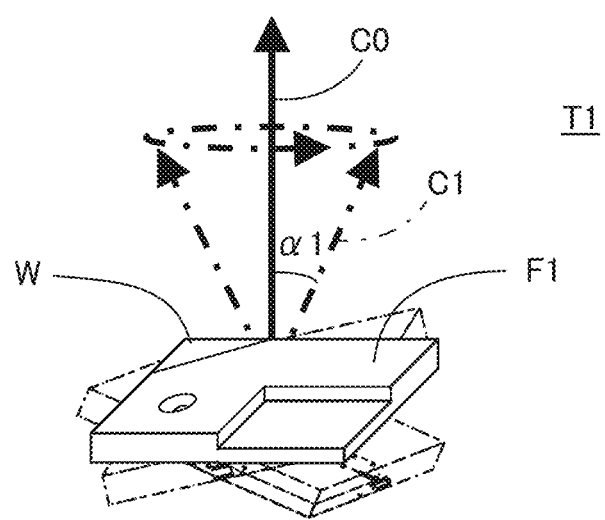
FIG. 7B is a diagram illustrating the tagging work of the first embodiment.

FIG. 7B is a diagram illustrating the tagging work of the first embodiment. First, a case where the front surface F1 is facing upward as illustrated in FIG. 7B will be described. In the case where the front surface F1 of the workpiece W is facing upward, an image of the front surface F1 of the workpiece W will be captured. If the workpiece W is taking a posture in which an axis C1 perpendicular to the front surface F1 is within a solid angle $\alpha 1$ defined with respect to an axis C0 perpendicular to a predetermined plane such as a horizontal plane, posture information T1 is provided for indicating that the front surface F1 of the workpiece W is facing upward. In a case where the back surface F2 of the workpiece W is facing upward, an image of the back surface F2 of the workpiece W will be captured. If the back surface F2 is facing upward, posture information is provided for indicating that the back surface F2 of the workpiece W is facing upward. The CPU 251 obtains the learned model 263 by using a plurality of images I0 that includes captured images of the front surface F1 of the workpiece W and captured images of the back surface F2 of the workpiece W. Note that if different surfaces of a workpiece have an identical appearance and an identical shape, the surfaces may be provided with identical posture information even though the surfaces are different surfaces. For example, if the front surface F1 and the back surface F2 have an identical appearance and an identical shape, both of the front surface F1 and the back surface F2 may be provided with the posture information T1. In contrast, if different surfaces have different appearances even though they have an identical shape, the surfaces may be provided with different pieces of posture information. For example, surfaces of a dice have different numbers. Thus, the surfaces of the dice may be provided with different pieces of posture information, so that the numbers of the surfaces of the dice can be recognized. In this manner, an operator specifies the area R0 and the posture information for the raw grayscale image I0 obtained from the camera 401, and thereby registers the plurality of learning data sets in the image processing apparatus 200. The CPU 251 of the image processing apparatus 200 performs machine learning by using a predetermined learning algorithm and the plurality of learning data sets, and thereby obtains the learned model 263 on which machine learning has been performed. The learned model 263 is stored in the HDD 254, for example.

The learning algorithm used may be SSD (single shot multibox detector), YOLO (you look only once), or the like. Note that the learning algorithm is not limited to the above-described algorithms and may be any algorithm as long as the algorithm can output the candidate areas A to D and the information that indicates the state of the workpiece W. In addition, for preparing the above-described learning data sets, actually captured images may be used as described above. In another case, however, images created in a virtual space, such as in a physical simulator, may be used.

In the first embodiment, the CPU 251 obtains the learned model 263 used for detecting the candidate areas, by using not only contours (i.e., edge information) of workpieces of the grayscale image I0, but also features in shade of workpiece images WI corresponding to workpieces W. The contours and features in shade of the workpiece images WI are obtained by causing the neural network to learn many patterns. Thus, even if the plurality of workpieces W is variously stacked in bulk, the CPU 251 can recognize a certain workpiece W from among the plurality of workpieces W stacked in bulk. That is, the CPU 251 can extract candidate areas.

The recognition portion 212 recognizes a state of a workpiece W for each of the plurality of candidate areas A to D, which the workpiece detection portion 211 has detected by using the learned model 263 (S103). The step S103 can be performed together with the step S102, which detects the candidate areas A to D, by using the algorithm such as SSD or YOLO. In this manner, by using the preset learned model 263, the recognition portion 212 determines the posture of a workpiece W corresponding to each of the candidate areas A to D, as the state of the workpiece W.

Figure 8A:
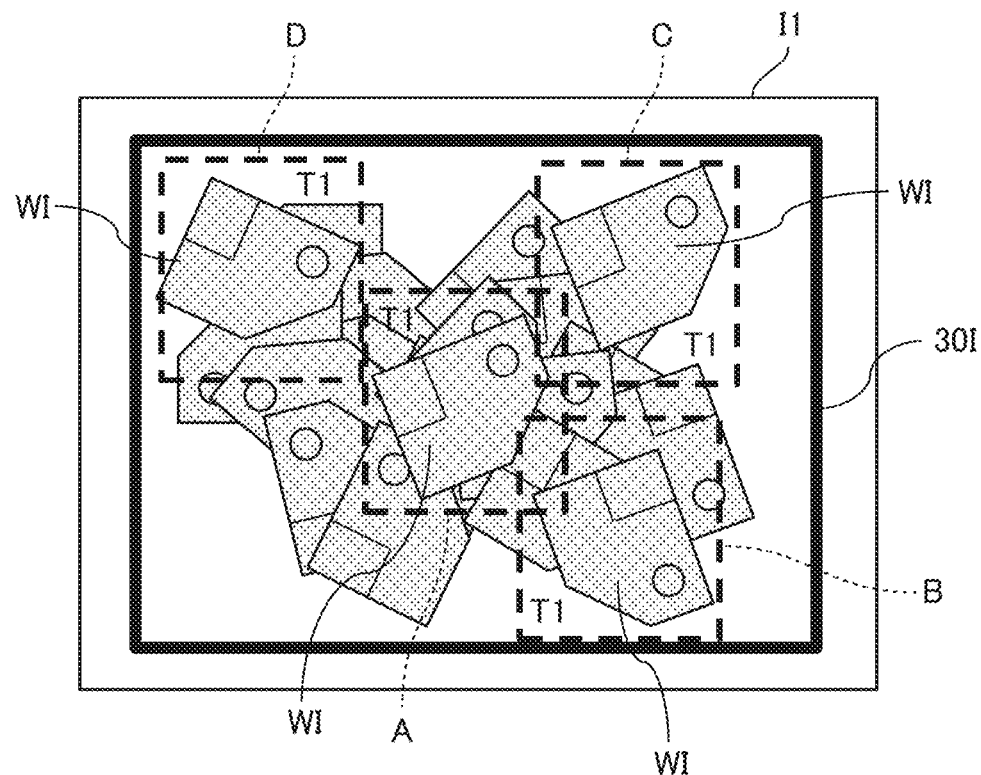
FIG. 8A is a schematic diagram illustrating one example of recognition results of the first embodiment.

FIG. 8A is a schematic diagram illustrating one example of recognition results of the first embodiment. In FIG. 8A, all the plurality of candidate areas A to D are provided with the posture information T1, as an example, which indicates that the front surface F1 of the workpiece W is facing upward. Note that the accuracy of the posture information of the workpiece W determined in Step S103 is insufficient for causing the robot 100 to hold the workpiece W. For this reason, in the first embodiment, the posture of the workpiece W is determined with high accuracy in a pattern matching process of later-described Step S108.

Then, the height detection portion 213 detects a height of a workpiece W in the vertical direction, that corresponds to a workpiece image WI contained in each of the plurality of candidate areas A to D (S104). Specifically, the height detection portion 213 detects the maximum height of a portion of a workpiece W corresponding to each of the candidate areas A to D. With this operation, differences in height between the workpieces W corresponding to the plurality of candidate areas A to D can be compared with each other. The robot 100 can pick a workpiece W located at a higher position, more easily than a workpiece W located at a lower position, from the plurality of workpieces W stacked in bulk. This is because a workpiece W located at a lower position is more likely to serve as a supporting point, in probability, that supports other workpieces W located at higher positions. Thus, if a workpiece W located at a lower position is picked, other workpieces W will easily collapse, or another workpiece W will be easily moved together with the workpiece W that is picked. For this reason, the height detection portion 213 detects the height of a workpiece W corresponding to each of the candidate areas A to D, for using the height of the workpiece W for assigning priorities of workpieces W in the next step S105.

Then, the priority determination portion 214 selects a workpiece W, as an object to be held by the robot 100 (S105). Specifically, the priority determination portion 214 assigns priorities to the candidate areas A to D, depending on a plurality of factors. Each factor indicates easiness for the robot 100 to hold a workpiece W, that is, a success rate of picking. For example, the factors are below-described three factors 1 to 3.

Factor 1: Exposure Degree $x_1$ of Workpiece W

An exposure degree $x_1$ of the workpiece W is a ratio of the area of a visible portion of a certain surface (e.g., the front surface F1 or the back surface F2) of the workpiece, to the area of the whole surface. Thus, as the exposure degree $x_1$ decreases, the plurality of workpieces W overlap more densely with each other. In contrast, as the exposure degree $x_1$ increases, the plurality of workpieces W overlap more sparsely with each other. Thus, as the exposure degree $x_1$ of the workpieces W increases, the probability of failure of picking a workpiece W decreases, and thus the success rate of picking the workpiece W increases. A method of calculating the factor 1 will be described.

Figure 8B:
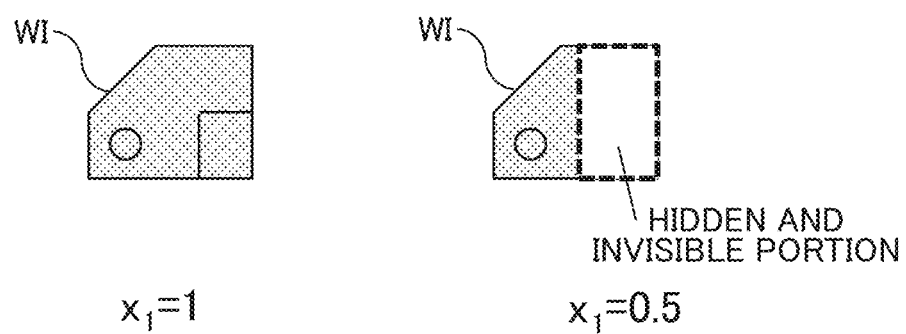
FIG. 8B is a schematic diagram for illustrating a method of calculating an exposure degree of a workpiece of the first embodiment.

FIG. 8B is a schematic diagram for illustrating the method of calculating the exposure degree $x_1$ of a workpiece of the first embodiment. For calculating the exposure degree $x_1$ of a workpiece W, a corresponding workpiece image WI of the image I1 is used. The exposure degree $x_1$ is a numerical value in a range equal to or larger than 0 and equal to or smaller than 1.

In determining the exposure rate $x_1$ in a single workpiece image WI, if the whole of a certain surface of a workpiece W is seen as the workpiece image WI, the exposure rate $x_1$ is 1. If half the area of a certain surface of the workpiece W is seen as the workpiece image WI, the exposure rate $x_1$ is 0.5. In this manner, the exposure degree $x_1$ of a workpiece W is calculated, based on the area of an exposure portion of the workpiece W that is seen from the camera 401. Such a calculation result can be obtained by teaching the robot 100 a state in which only a workpiece W having an exposure degree $x_1$ of 1 exists, and the teaching is performed when the learned model 263 is created by using the object detection, such as SSD or YOLO. That is, since the object detection, such as SSD or YOLO, can output a degree of similarity of an object with respect to a learned data group, as a probability density function such as a softmax function, the degree of similarity is decreased in accordance with the ratio of the area of a visible portion to the area of the whole surface. This feature of the object detection can be used for determining the exposure degree $x_1$ of the workpiece W. Note that since the method of measuring the exposure degree $x_1$ of the workpiece W is not limited to the above-described method, other methods may be used for determining the exposure degree $x_1$ of the workpiece W.

Factor 2: Scattering Degree $x_2$ of Workpieces W

A scattering degree $x_2$ of workpieces W is a positional relationship between the plurality of candidate areas. In the plurality of workpieces W stacked in bulk, each workpiece W takes a position and posture at random. Thus, in an area in which workpieces W exist, uneven distribution occurs. For example, a dense portion and a sparse portion of workpieces W are formed. In the dense portion in which workpieces W exist densely, the workpieces W are easily caught by each other in probability, and easily collapse due to an external force. Thus, the success rate of picking a workpiece W tends to increase in an area in which workpieces W exist sparsely, that is, in an area separated and isolated from the dense portion of workpieces W. For this reason, it is suitable to add the scattering degree $x_2$ that indicates the degree of isolation of workpieces W. For example, the scattering degree $x_2$ of the candidate area A illustrated in FIG. 6B is calculated by using the following equation (1).

$$x_2 = \frac{S(A) - (S(A) \cap S(B) + S(A) \cap S(C) + S(A) \cap S(D))}{S(A)} \quad (1)$$

In the equation (1), S(A) denotes the area of the candidate area A. The scattering degree $x_2$ is calculated by subtracting the area of portions shared by the candidate area A and the other candidate areas B to D, from the area of the candidate area A itself. Thus, the scattering degree $x_2$ becomes closer to 0 as the workpieces W exist in a denser portion, and becomes closer to 1 as the workpieces W exist in a sparser portion. Thus, as the scattering degree $x_2$ increases, the priority of picking increases. The difference between the exposure degree $x_1$ and the scattering degree $x_2$ will be described. The exposure degree $x_1$ and the scattering degree $x_2$ are different from each other in that the exposure degree $x_1$ represents a hidden portion of a workpiece W that has not been detected in the object detection process, and that the scattering degree $x_2$ represents the density or sparseness of workpieces W that has been detected in the object detection process.

Factor 3: Height $x_3$ of Workpieces W Stacked in Bulk

A height $x_3$ is a height of a workpiece W with respect to a ground in the vertical direction. In the first embodiment, the ground is a bottom surface of the container 30.

In a case where the robot 100 approaches a workpiece W, which is an object to be picked, from above the plurality of workpieces W stacked in bulk, the success rate of picking the workpiece W increases as the workpiece W is located closer to a top portion of the plurality of workpieces W. If the plurality of workpieces W has an identical exposure degree $x_1$ and an identical scattering degree $x_2$, a priority is given to a workpiece W of the plurality of workpieces W that is located at a higher position, for increasing the success rate of picking. For example, the height $x_3$ of a workpiece W corresponding to the candidate area A is calculated by using the following equation (2).

$$x_3 = \frac{H(A)}{\max(H(A), H(B), H(C), H(D))} \quad (2)$$

In the equation (2), H(A) denotes a value of a height of a workpiece W corresponding to the candidate area A, and is a value detected by the height detection portion 213. The parameter H(A), which is a piece of height information, may denote the maximum value or an average value of height of the workpiece W corresponding to the candidate area A, and the maximum value or the average value can be selected as appropriate.

Figures 9A, 9B:
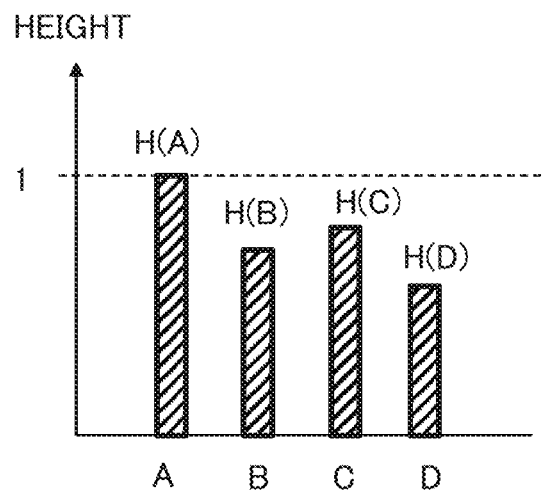
FIG. 9A is a graph illustrating one example of height of a workpiece corresponding to each candidate area of the first embodiment.
FIG. 9B is a table illustrating one example of priorities of the first embodiment.

FIG. 9A is a graph illustrating one example of the height $x_3$ of workpieces corresponding to the candidate areas A to D of the first embodiment. As illustrated in FIG. 9A, the height $x_3$ is a ratio of a height of a workpiece W of each of the candidate areas A to D, to the maximum height of all the workpieces W corresponding to the candidate areas A to D. That is, the height $x_3$ becomes closer to 0 as the height of a workpiece W decreases with respect to the maximum height, and becomes closer to 1 as the height of the workpiece W becomes closer to the maximum height. Thus, as the height $x_3$ increases, the priority of picking increases.

Then, the priority determination portion 214 calculates an index $f_i$ used for determining priorities, by using the following equation (3) that includes the three factors, which have been described above as the plurality of factors. Specifically, the priority determination portion 214 calculates the index $f_i$ by multiplying each of the factors 1 to 3 with a corresponding weight coefficient and summing the factors, as expressed by the equation (3). The index $f_i$ indicates easiness of picking a workpiece in each candidate area.

$$f_i = \alpha x_{1i} + \beta x_{2i} + \gamma x_{3i} \qquad (3)$$

Note that $\alpha + \beta + \gamma = 1$.

The subscript i indicates a number assigned to each of a plurality of candidate areas. For example, if the four candidate areas A to D are detected, the subscript i has a value of one of 1 to 4. The index $f_i$ is an evaluation value that indicates easiness of picking a workpiece in each of the candidate areas. In addition, the weight coefficients $\alpha$, $\beta$, and $\gamma$ are coefficients whose sum is 1. The weight coefficients can be freely set, depending on which factor is given importance. As an index $f_i$ corresponding to a workpiece W increases, the robot 100 can more easily hold the workpiece W.

The priority determination portion 214 calculates the index $f_i$ for each of the candidate areas A to D. Then the priority determination portion 214 determines priorities by comparing one index $f_i$, which corresponds to each of the candidate areas A to D, with the other. That is, the priority determination portion 214 calculates the index $f_i$ by using the plurality of factors 1 to 3; and determines priorities of workpieces W to be picked out of the container 30, based on the index $f_i$.

In the first embodiment, the priority determination portion 214 determines a candidate area having the maximum index $f_i$, as a search area which is used in the next step S106, and in which the position and posture of a workpiece W is searched for. That is, the priority determination portion 214 selects a candidate area having the top priority from among two or more detected candidate areas, and determines the candidate area as the search area. The search area contains a workpiece image corresponding to an object to be held by the robot 100. In this manner, the priority determination portion 214 determines one of the two or more workpieces W, as the object to be held by the robot 100. More specifically, the priority determination portion 214 determines a priority for each of the two or more workpieces W; and selects a workpiece W having the top priority from among the two or more workpieces W, and determines the workpiece W, as the object to be held by the robot 100.

FIG. 9B is a table illustrating one example of priorities of the first embodiment. For example, if $\alpha = 0.3$, $\beta = 0.4$, and $\gamma = 0.3$ in the equation (3), the weight coefficient $\beta$ of the scattering degree $x_2$ is given importance, and the top priority is given to the candidate area D. Note that although the description has been made, as an example, for the case where the three factors 1 to 3 are used for calculating the index $f_i$, the present disclosure is not limited to this. If there is another factor related to the success rate of picking, the factor may be added to the equation (3). In this manner, the priority determination portion 214 calculates a priority for each of the two or more workpieces W, by using the plurality of factors 1 to 3.

Note that if the workpiece detection portion 211 detects only one candidate area in Step S102, the priority determination portion 214 determines the candidate area as the search area in Step S105. Thus, in this case, the priority calculation process and the height detection process performed for the priority calculation process may not be performed.

Then, the CPU 351 of the robot controller 300 moves the robot 100 so that the camera 402 moves to a position at which the camera 402 is positioned close to a workpiece W that is an object selected by the priority determination portion 214 (S106). Note that the position at which the camera 402 is positioned close to the workpiece W is a position above the workpiece W, at which the image capture area of the camera 402 contains a real-space area corresponding to the search area. When the camera 402 is positioned close to the workpiece W, it is preferable that the center of the image capture area of the camera 402 be aligned with the center of the real-space area corresponding to the search area. Since the camera 402 is moved close to the workpiece W that is the object selected by the priority determination portion 214, the target whose image is to be captured can be narrowed to one of the plurality of workpieces W stacked in bulk, and the resolution of the image I2, which can be obtained by capturing an image of the real-space area corresponding to the search area, can be increased. Therefore, the processing time required for the pattern matching process performed in the later-described step S108 can be shortened.

Figure 10A:
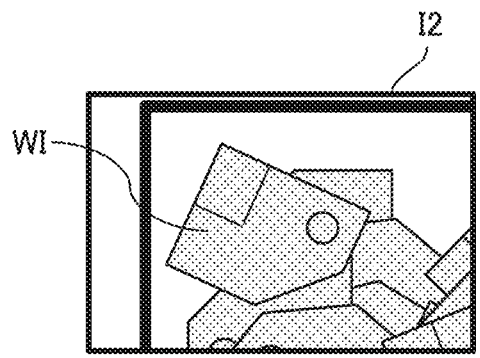
FIG. 10A is a schematic diagram of an image obtained from a camera of the first embodiment.

Then, the measurement portion 215 sends an image capture command to the camera 402, and causes the camera 402 to capture an image of the workpiece W that is the object selected by the priority determination portion 214 (S107). The image I2 obtained from the camera 402 may be a grayscale image or a three-dimensional point group image that contains depth information, as long as the image I2 has a format that can be used in the pattern matching process in the next step S108. In the first embodiment, the image I2 is a grayscale image. FIG. 10A is a schematic diagram of the image I2 of the object of the first embodiment, captured by the camera 402. As illustrated in FIG. 10A as an example, the image I2 is an image that contains a workpiece image WI of the workpiece W that is the object selected by the priority determination portion 214.

Then, the measurement portion 215 performs the pattern matching process on the image I2 (S108), and thereby determines the position and posture of the workpiece W that is the object selected by the priority determination portion 214. The accuracy of the posture information of the workpiece W obtained by the pattern matching process in the first embodiment is higher than the accuracy of the posture information of the workpiece W obtained in Step S103. The pattern matching process is performed on the image I2 outputted by the camera 402, by using CAD data 260 that is stored in advance in a storage device, such as the HDD 254 illustrated in FIG. 3. The CAD data 260 is a model that represents the shape of the workpiece W that is an object, and contains ridge-line information, or line-segment information, of the workpiece W. In the first embodiment, the measurement portion 215 performs preprocessing, such as edge detection, on the grayscale image I2, compares the line-segment information obtained through the preprocessing, with the line-segment information contained in the CAD data 260, and calculates the degree of agreement, as a score.

Figure 10B:
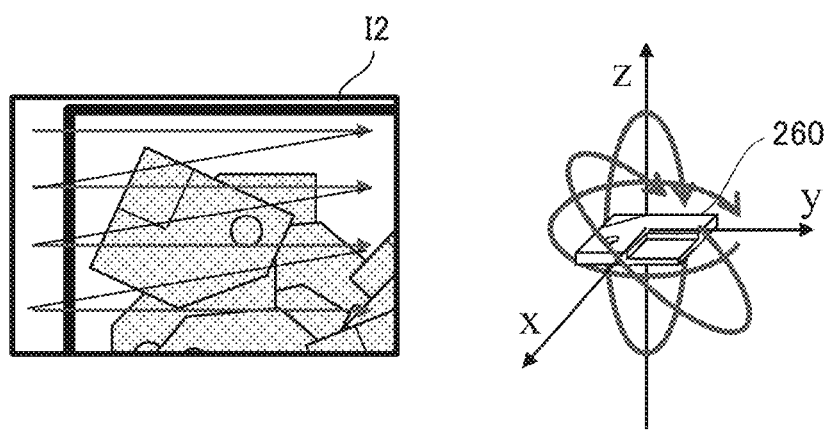
FIG. 10B is a schematic diagram for illustrating a pattern matching process of a comparative example.

Here, a pattern matching process of a comparative example will be described. FIG. 10B is a schematic diagram for illustrating the pattern matching process of the comparative example. As illustrated in FIG. 10B, the pattern matching process of the comparative example is performed by using line-segment information contained in the CAD data 260 and created for all postures obtained at 0 to 360 degrees around each axis. In addition, the pattern matching process is started from the upper left pixel of the image I2, and is performed thoroughly in an interlaced manner. Thus, since the computational complexity order is O ($n^3$) based on the number of axes that represent postures, the amount of calculation and the processing time increase.

Figure 10C:
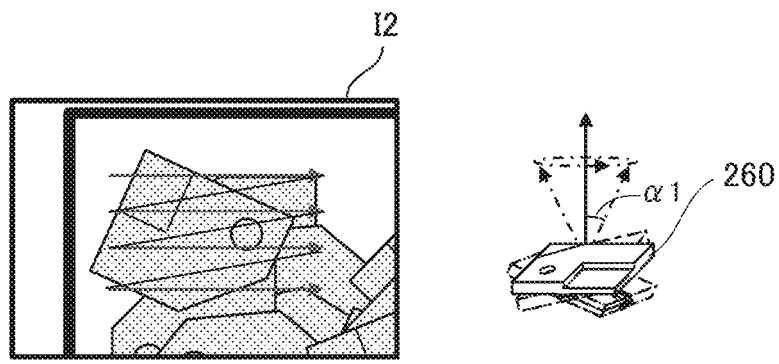
FIG. 10C is a schematic diagram for illustrating a pattern matching process of the first embodiment.

FIG. 10C is a schematic diagram for illustrating a pattern matching process of the first embodiment. In the first embodiment, the measurement portion 215 performs the pattern matching process, based on the posture information determined by the recognition portion 212. Specifically, the measurement portion 215 determines a posture of a model that is CAD data used for the pattern matching process, based on the posture of the workpiece W recognized by the recognition portion 212. For example, Since the recognition portion 212 recognizes the workpiece W whose image is contained in the search area and whose posture defined with respect to an axis perpendicular to a predetermined plane such as a horizontal plane is within the predetermined angle α1, a posture of the ridge-line contained in the CAD data 260 and used for the comparison in the pattern matching process can be reduced to within the angle α1 around each axis. Thus, as the angle recognized by the recognition portion 212 is set more finely, the load of the pattern matching process can be more significantly reduced, and the processing time can be reduced accordingly.

Figure 11:
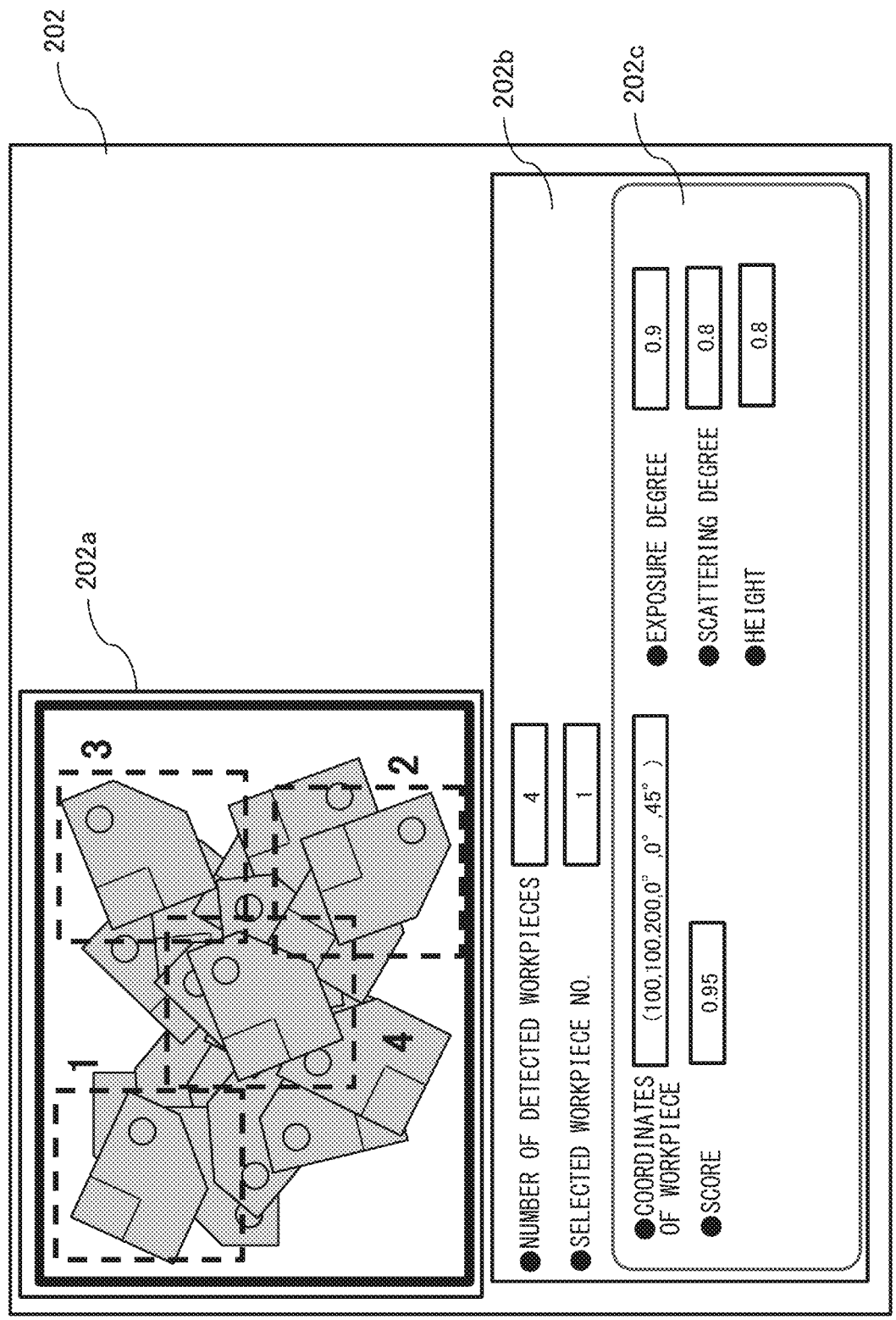
FIG. 11 is a diagram illustrating one example of display, performed by a display of the first embodiment.

The recognition result obtained in this manner may be displayed on a screen of the display 202, as illustrated in FIG. 11, for notifying an operator or user of the result. The CPU 251 displays a workpiece display portion 202a and a workpiece detailed-display portion 202b, on the screen of the display 202. The workpiece detailed-display portion 202b contains a detailed-data display portion 202c. In the workpiece display portion 202a, the candidate areas obtained in Step S102 are displayed together with respective priorities obtained in Step S105. In the workpiece detailed-display portion 202b, the number of detected workpieces and the number of a workpiece to be picked are displayed. In the example illustrated in FIG. 11, "4" is displayed as the number of detected workpieces, and the number of a workpiece having a priority of 1 is displayed. In addition, in the example illustrated in FIG. 11, in the detailed-data display portion 202c, detailed data of the workpiece having a priority of 1 is displayed. In the detailed-data display portion 202c, factor information, such as the exposure degree, the scattering degree, and the height, obtained in Step S105, and coordinate information and score information obtained in Step S108 are displayed. In the example illustrated in FIG. 11, "(100, 100, 200, 0°, 0°, 45°)" is illustrated as coordinates of the workpiece. In addition, in the example illustrated in FIG. 11, "0.95" is illustrated as the score information, "0.9" is illustrated as the exposure degree, "0.8" is illustrated as the scattering degree, and "0.8" is illustrated as the height. Thus, the operator watches the screen of the display 202, and thereby can easily check which one of the workpieces stacked in bulk is to be picked with priority and what condition the workpiece to be picked is in.

In addition, since the center of the search area and the center of the image capture area of the camera 402 are aligned with each other, a workpiece image WI to be searched for is located at or near the center of the image I2. Thus, without comparing the whole of the image I2 with a model in an interlaced manner, the pattern matching process may be performed on only a center portion of the image I2 in consideration of the size of the workpiece W. If the above-described process is added, the processing time required for the pattern matching process can be shortened.

Then, the CPU 351 of the robot controller 300 controls the robot 100, based on the positional information and the posture information of the workpiece W obtained through the pattern matching process, so that the robot hand 102 moves to a hold position at which the robot hand 102 will hold the workpiece W (S109). Then, the CPU 351 controls the robot 100 so that the robot hand 102 holds the workpiece W (S110). Then, the CPU 351 controls the robot 100 so that the robot 100 conveys the workpiece W to a predetermined position on the stand 40 (S111). If the robot 100 is to pick another workpiece W out of the container 30, the process returns to Step S101 and repeats the steps S101 to S110. In this manner, the robot 100 can pick workpieces W, continuously one by one, stacked in bulk.

Thus, by performing the picking work on the workpieces W depending on the above-described flowchart, it is possible to narrow the search area even if the workpieces W are stacked in bulk. In addition, since a workpiece that can be easily picked by the robot 100 is selected with priority, the success rate for the robot 100 to pick the workpiece increases. In addition, since the learned model 263 is used, the number of workpieces recognized as workpieces that can be easily picked can be increased. In the conventional art, the pattern matching is performed without narrowing an area of an image obtained. In the first embodiment, however, the area is narrowed to the search area for performing the pattern matching. Thus, the processing time required for the pattern matching process can be shortened. Therefore, the productivity of products manufactured by the robot 100 is increased.

Second Embodiment

Figure 12:
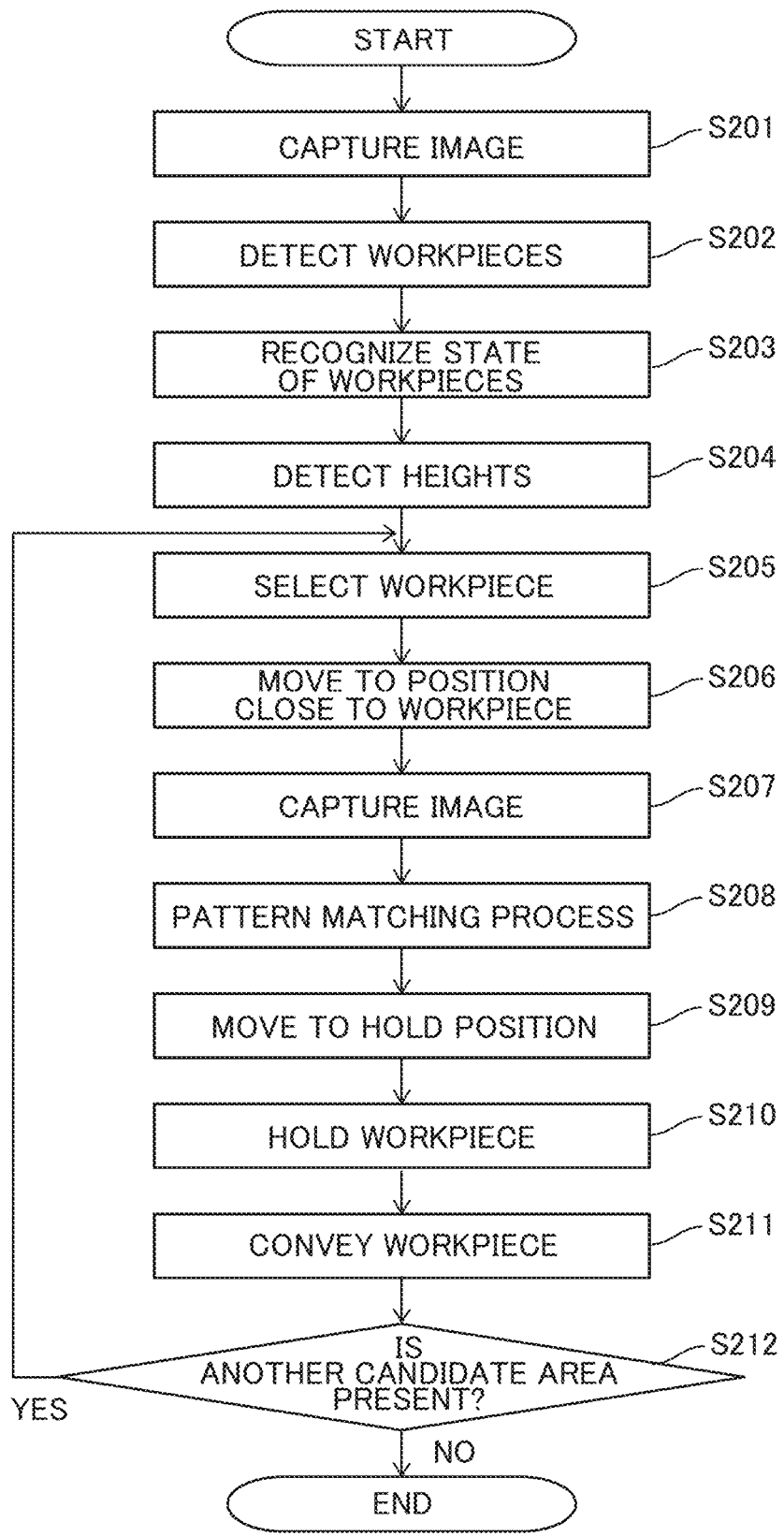
FIG. 12 is a flowchart illustrating a control method of a robot of a second embodiment.

Next, a second embodiment will be described. FIG. 12 is a flowchart illustrating a control method of a robot of the second embodiment. Note that since the configuration of a robot system of the second embodiment is the same as that of the first embodiment, the description thereof will be omitted. In addition, since steps S201 to S211 illustrated in FIG. 12 are the same as the steps S101 to S111 illustrated in FIG. 5 and described in the first embodiment, the description thereof will be omitted.

After the robot 100 picks a workpiece W out of the container 30, the priority determination portion 214 determines in Step S212 whether there is another candidate area other than a candidate area having been selected in Step S205, as a search area.

If there is another candidate area (S212: YES), then the priority determination portion 214 returns to Step S205 and sets the other candidate area having the following priority, as a new search area. In this case, the calculation of priority is omitted. That is, in Step S205, the priority determination portion 214 selects another workpiece W with the next highest priority from among two or more workpieces W except for the workpiece W that is an object having been selected previously by the priority determination portion 214. The other workpiece W selected by the priority determination portion 214 is the following object to be held by the robot 100.

In an example of the first embodiment, after a workpiece W corresponding to the candidate area D is picked out of the container 30, the following index $f_i$ of easiness of picking indicates a workpiece W corresponding to the candidate area B. Thus, the priority determination portion 214 sets the candidate area B as a new search area. In this manner, the steps S201 to S204 and the computing process for the index $f_i$ performed in Step S205 can be omitted.

Note that the steps S201 to S204 and the computing process for the index $f_i$ performed in Step S205 can be omitted in a case where the position and posture of the following workpiece W has not been significantly changed. Thus, a monitoring apparatus may be additionally disposed for monitoring the position and posture of the workpieces W. In another case, after the robot 100 picks a workpiece W out of the container 30, the CPU 251 may cause the camera 401 to capture an image of the workpieces again, and may determine whether the state of candidate areas other than the search area has changed, by checking the difference between two images, one of which is an image captured before the workpiece W is picked and the other is an image captured after the workpiece W is picked. Note that one of the second embodiment and a modification thereof may be combined with one of the first embodiment and a modification thereof.

Third Embodiment

Next, a third embodiment will be described. In the above-described first embodiment, in Step S105 of FIG. 5, the priority determination portion 214 calculates the index $f_i$ by using the three factors 1 to 3, and determines priorities of workpieces W to be picked out of the container 30. However, the number of factors used for calculating the index $f_i$ is not limited to three. In the third embodiment, the description will be made for a case where another factor other than the three factors 1 to 3 described in the first embodiment is added as a factor used for calculating the index $f_i$. The factor added in the third embodiment is a factor related to a success rate of picking a workpiece, which is determined based on a record of picking performed in the past. Note that since the configuration of a robot system of the third embodiment is the same as that of the first embodiment, the description thereof will be omitted.

Figure 13:
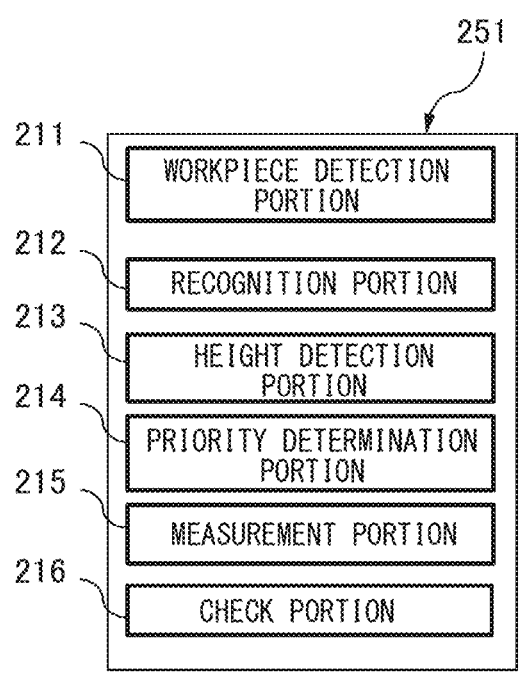
FIG. 13 is a block diagram illustrating functions of a CPU of a third embodiment.

FIG. 13 is a block diagram illustrating functions of a CPU 251 of the third embodiment. The CPU 251 functions as a check portion 216 in addition to the workpiece detection portion 211, the recognition portion 212, the height detection portion 213, the priority determination portion 214, and the measurement portion 215, by executing the program 261. The check portion 216 checks whether the robot 100 has succeeded or failed in holding a workpiece W in Step S110 of FIG. 5.

In the third embodiment, an object detection sensor (not illustrated) is disposed on the robot hand 102 for checking the presence of a workpiece W, and the check portion 216 checks whether the robot 100 has succeeded or failed in holding a workpiece W, depending on a signal from the object detection sensor (not illustrated). Note that the check portion 216 may obtain an image of the robot hand 102 captured by and sent from an image capture apparatus (not illustrated), and may check whether the robot 100 has succeeded or failed in holding a workpiece W, depending on the image.

The check portion 216 outputs two values, depending on the presence and absence of the workpiece W. For example, the check portion 216 outputs "1" if the check portion 216 detects the presence of the workpiece W, and outputs "0" if the check portion 216 detects the absence of the workpiece W.

The check portion 216 then trims the search area corresponding to a workpiece W off the image I1. FIG. 14A is a schematic diagram for illustrating a trimming process of the third embodiment. In the example illustrated in FIG. 14A, the candidate area D is trimmed off.

FIG. 14B is a schematic diagram for illustrating a learned model of the third embodiment. A data set of a trimming image and the information indicating whether the robot 100 has succeeded or failed in holding a workpiece W is prepared. With the data set, the correlation between the trimming image and the information indicating whether the robot 100 has succeeded or failed in holding a workpiece W can be learned by a neural network. The neural network used may be a model used for the class separation. For example, the neural network may be achieved by an algorithm, such as VGG (visual geometry group). In this manner, a learned model in which the trimming image and the information on success or failure of holding are associated with each other is created. The learned model may be stored in a storage device, such as the HDD 254 illustrated in FIG. 3. Thus, the priority determination portion 214 can estimate a success rate $x_4$ at which the robot 100 tried to hold workpieces W in the past. The success rate $x_4$ is estimated for each of candidate areas used in Step S102 of FIG. 5, based on a record of picking performed in the past. Thus, if the success rate $x_4$ is added to the equation (3), the index $f_i$ is expressed by the following equation (4).

$$f_i = \alpha x_{1i} + \beta x_{2i} + \gamma x_{3i} + \delta x_{4i} \quad (4)$$

In the equation (4), $\alpha+\beta+\gamma+\delta=1$.

Since the priorities of picking workpieces are determined in this manner in consideration of the success rate of picking performed in the past, the success rate of picking can be increased. Note that one of the third embodiment and a modification thereof may be combined with one of the above-described various embodiments and modifications thereof.

Fourth Embodiment

Figure 15:
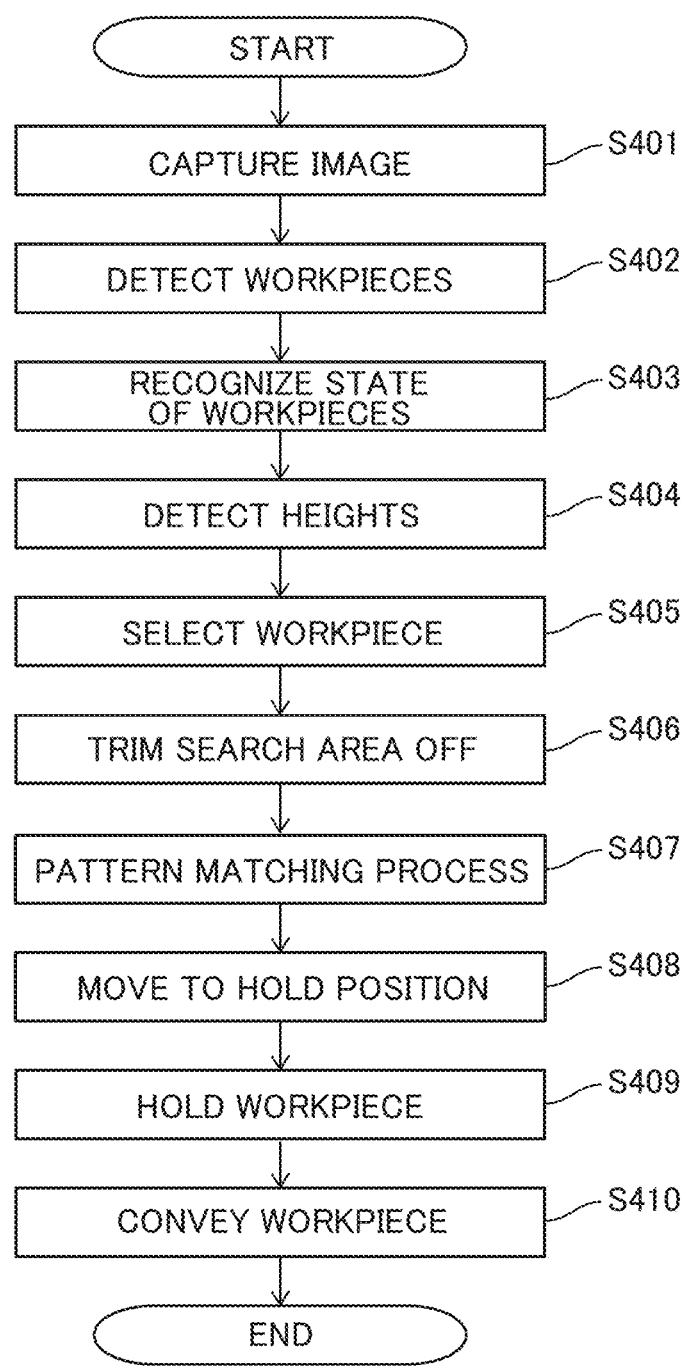
FIG. 15 is a flowchart illustrating a control method of a robot of a fourth embodiment.

Next, a fourth embodiment will be described. In the image capture system 400 illustrated in FIG. 1, one of the cameras 401 and 402 may not be disposed. In the fourth embodiment, the description will be made for a case where the camera 402 is not disposed in the robot system 10 illustrated in FIG. 1. FIG. 15 is a flowchart illustrating a control method of a robot of the fourth embodiment. In the flowchart illustrated in FIG. 15, the closeup image is not captured.

Since steps S401 to S405 of the fourth embodiment are the same as the steps S101 to S105 illustrated in FIG. 5 and described in the first embodiment, the description thereof will be omitted.

In Step S406, the measurement portion 215 trims the search area described in the first embodiment, off the image I1 obtained from the camera 401; and thereby obtains the image data of the search area. For example, if the candidate area D is determined as the search area as illustrated in FIG. 14A, the candidate area D is trimmed off. The search area is a partial area of the image I1. The search area contains an image of a workpiece W that is an object.

In Step S407, the measurement portion 215 performs the pattern matching process on the search area that has been trimmed off. Also in this case, the measurement portion 215 performs the pattern matching process, based on the posture information of the workpiece W recognized by the recognition portion 212. Thus, the amount of calculation required for the pattern matching process can be reduced, and thus the processing time required for the pattern matching process can be shortened accordingly.

Since steps S408 to S410 are the same as the steps S109 to S111 illustrated in FIG. 5 and described in the first embodiment, the description thereof will be omitted.

Note that if the image capture area of the camera 401 can be narrowed to the search area by using a zoom lens or the like and an image of the search area can be captured, the camera 402 may not be disposed in the image capture system 400, and the image I2 may be produced by the camera 401. In another case, the camera 401 may not be disposed in the image capture system 400. In this case, the position of the camera 402 may be adjusted by the motion of the robot 100, and the image I1 may be produced by the camera 402. Note that one of the fourth embodiment and a modification thereof may be combined with one of the above-described various embodiments and modifications thereof.

Fifth Embodiment

Figure 16A:
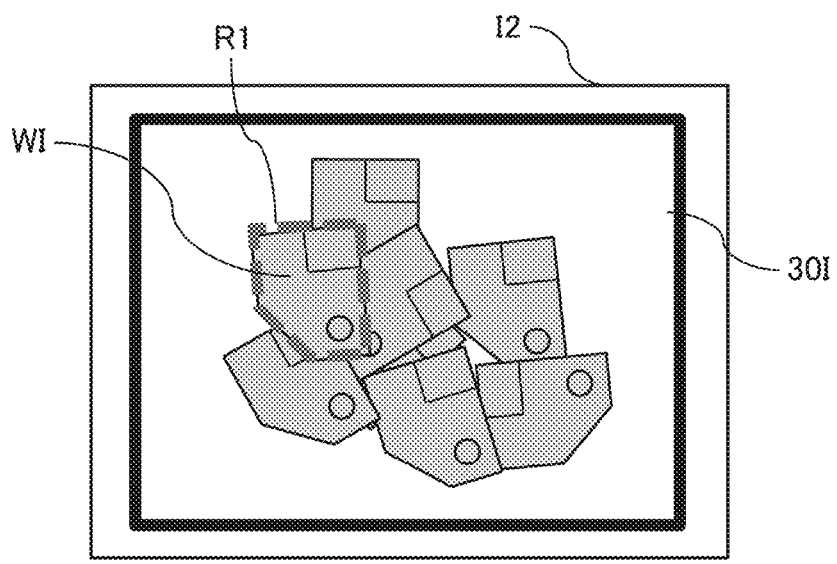
FIG. 16A is a schematic diagram illustrating one example of an image of a fifth embodiment.

Next, a fifth embodiment will be described. In the above-described first embodiment, the workpiece detection portion 211 illustrated in FIG. 4A detects a workpiece W, as a rectangular candidate area, by using the deep-learning algorithm, such as SSD or YOLO. However, the shape of candidate areas to be detected is not limited to rectangular shapes. In the fifth embodiment, the description will be made for a case where an algorithm that detects a workpiece W by using a non-rectangular area is used. Examples of the algorithm that can be used for the fifth embodiment include instance segmentation. FIG. 16A is a schematic diagram illustrating one example of the image I2 of the fifth embodiment. In the teaching, many images I2 as illustrated in FIG. 16A are prepared. An operator specifies an area R1 that encloses a workpiece image WI, along the contour of the workpiece image WI contained in the image I2; and associates the area R1 with the information that indicates the state of the workpiece image WI enclosed by the area R1. Then the operator causes the image processing apparatus 200 to learn these pieces of information by using the algorithm and a neural network. Since the information that indicates the state of a workpiece W and the learning performed by the neural network are the same as those of the first embodiment described with reference to FIG. 7B, the description thereof will be omitted.

Figure 16B:
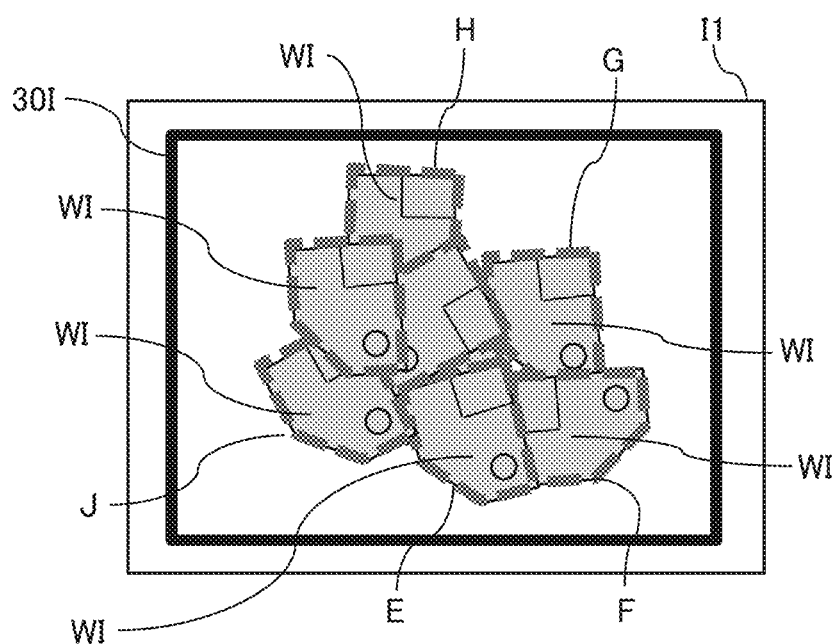
FIG. 16B is a schematic diagram for illustrating a detection process of the fifth embodiment.

FIG. 16B is a schematic diagram for illustrating a detection process of the fifth embodiment. As illustrated in FIG. 16B, the learning is performed by the workpiece detection portion 211 that uses the instance-segment algorithm, so that the workpiece detection portion 211 outputs candidate areas, each of which is formed along the contour of a corresponding workpiece image WI. In this manner, the workpiece detection portion 211 can output candidate areas E to J, as illustrated in FIG. 16B. The candidate areas E to J are associated with information on respective states of workpieces W. Thus, when the measurement portion 215 performs a pattern matching process, the pattern matching process can be performed on an area enclosed by the contour of a workpiece. If a candidate area is rectangular, the pattern matching process will be performed also on a portion of the candidate area that is outside the contour of the workpiece. Since the portion is not necessary for the pattern matching process, performing the pattern matching process on a portion of the candidate area that is inside the contour of the workpiece can reduce the time required for the pattern matching process. Note that although the instance segmentation is used as an example, in the fifth embodiment, as the algorithm that can output a result in which an area formed along the contour of a workpiece image WI is associated with the information on the state of the workpiece W, another algorithm may be used as long as the algorithm has the same function. Note that one of the fifth embodiment and a modification thereof may be combined with one of the above-described various embodiments and modifications thereof.

Sixth Embodiment

Next, a sixth embodiment will be described. In the above-described first embodiment, the robot hand 102 moves to a hold position in Step S109 of FIG. 5, and holds a workpiece in Step S110. The hold position is eventually a single position. However, a single hold-position candidate may not necessary be set for a single workpiece. For example, a plurality of hold-position candidates may be set for a single workpiece. In the sixth embodiment, a single hold-position candidate is eventually selected from among a plurality of hold-position candidates, for increasing the success rate of picking.

Figure 17:
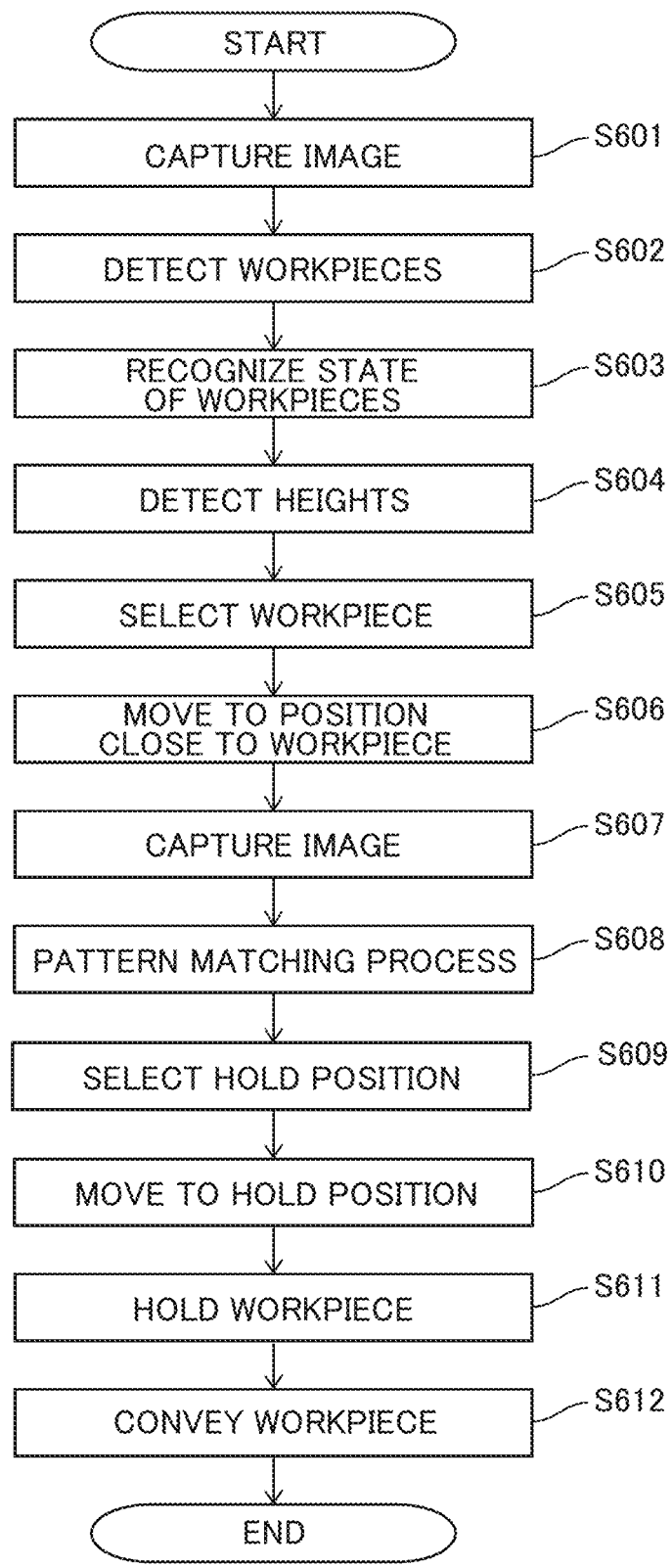
FIG. 17 is a flowchart illustrating a control method of a robot of a sixth embodiment.
Figure 18:
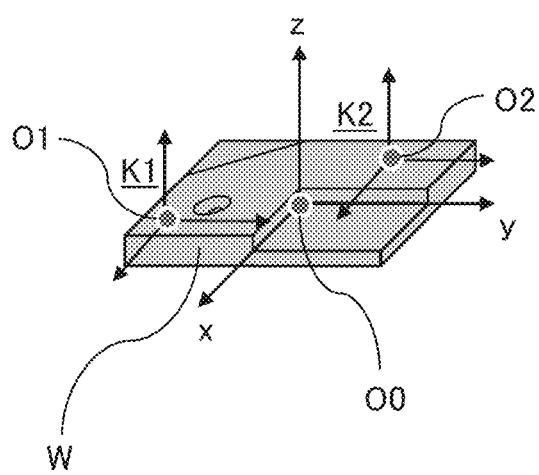
FIG. 18 is a diagram illustrating a plurality of hold-position candidates of the sixth embodiment.

FIG. 17 is a flowchart illustrating a control method of a robot of the sixth embodiment. Note that since the configuration of a robot system of the sixth embodiment is the same as that of the first embodiment, the description thereof will be omitted. In addition, since steps S601 to S608 and S610 to S612 of FIG. 17 are the same as the steps S101 to S108 and S109 to S111 illustrated in FIG. 5 and described in the first embodiment, the description thereof will be omitted. FIG. 18 is a schematic diagram illustrating a plurality of hold-position candidates that are set for a workpiece W.

In the sixth embodiment, after the pattern matching process of Step S608 is performed, Step S609 is additionally performed for selecting a hold position from among a plurality of hold-position candidates. The plurality of hold-position candidates is determined in advance by an operator, as illustrated in FIG. 18. FIG. 18 illustrates a reference position and posture O0 of a workpiece W, a position and posture O1 of a hold-position candidate K1, and a position and posture O2 of a hold-position candidate K2. That is, the information on the position and posture O1, and the information on the position and posture O2 can be freely set by an operator. Thus, the positions and postures of O1 and O2 viewed from and relative to the reference position and posture O0 are known by the operator.

When the pattern matching process is performed in Step S608, the reference position and posture O0 as a position and posture of the workpiece W is obtained as a position and posture viewed from another coordinate system (not illustrated). The other coordinate system described above is a coordinate system for the robot system 10, for example. In addition, since the positions and postures O1 and O2 viewed from and relative to the reference position and posture O0 are known, it is possible to obtain the positions and postures of the hold-position candidates K1 and K2, viewed from the other coordinate system. The heights of the hold-position candidates K1 and K2 with respect to the ground, that is, with respect to the bottom surface of the container 30 are obtained by using the method described in the first embodiment.

In Step S609, the CPU 251 eventually selects one of the hold positions of the hold-position candidates K1 and K2. For example, the selection method can use any one of the following factors.

factor 1: a factor for selecting a hold position located at the highest position with respect to the ground or the bottom surface of the container 30.

factor 2: a factor for selecting a hold position located closest to the center of gravity of the workpiece.

factor 3: a factor for selecting a hold position which the robot arm 101 can approach in the shortest time.

The use of these factors is advantageous in the following points.

The advantage of use of the factor 1 is as follows. The workpieces are stacked in bulk. Thus, if a workpiece is located in an upper position in the workpieces stacked in bulk, the workpiece is more likely exposed from other workpieces. In contrast, if a workpiece is located in a lower position in the workpieces stacked in bulk, workpieces including the workpiece are denser, and the workpiece is more likely in close contact with other workpieces. Thus, if an upper hold-position candidate of the plurality of hold-position candidates is selected as a hold position, the possibility that workpieces other than a target workpiece are also picked when the target workpiece is picked can be reduced.

The advantage of use of the factor 2 is as follows. After the robot 100 holds a workpiece, centrifugal force is produced in the workpiece when the robot 100 moves the workpiece held by the robot 100. In this case, the centrifugal force has a larger value at or near the center of gravity of the workpiece. Thus, if a portion of the workpiece at or near the center of gravity of the workpiece is held by the robot hand 102, the reaction force against the moment of inertia produced by the centrifugal force is easily produced. As a result, the possibility that the workpiece falls from the robot hand 102 when moved can be reduced.

The advantage of use of the factor 3 is as follows. If the factor 3 is used, the robot hand 102 can approach the workpiece in the shortest time, and the amount of movement of the robot arm 101 becomes minimum. Thus, the possibility of failure of picking, caused by the interference between the robot arm 101 and other workpieces other than a target workpiece, can be reduced.

As described above, in the sixth embodiment, a hold position that can reduce the failure of picking can be selected from among the plurality of hold-position candidates, in accordance with a state of workpieces obtained when a workpiece is to be picked. Thus, the success rate of picking a workpiece can be increased. For eventually selecting a single hold position, two or more factors of the plurality of factors may be combined with each other in combination. Note that one of the sixth embodiment and a modification thereof may be combined with one of the above-described various embodiments and modifications thereof.

Seventh Embodiment

Next, a seventh embodiment will be described. In the above-described sixth embodiment, the pattern matching process is performed in Step S608 of FIG. 17, and then a hold position is selected in Step S609. In the seventh embodiment, the description will be made for a control method in which, before a hold position is selected, an interference determination is performed for determining the interference between the robot hand 102 and workpieces W other than a workpiece W to be picked. FIG. 19 is a flowchart illustrating a control method of a robot of the seventh embodiment. Note that since the configuration of a robot system of the seventh embodiment is the same as that of the first embodiment, the description thereof will be omitted. In addition, since steps S701 to S708 and S710 to S713 of FIG. 19 are the same as the steps S601 to S612 illustrated in FIG. 17 and described in the sixth embodiment, the description thereof will be omitted.

In the seventh embodiment, as in the sixth embodiment, the CPU 251 performs the pattern matching in Step S708, and thereby obtains a plurality of hold-position candidates. In Step S709, the CPU 251 determines for each hold-position candidate whether the robot hand 102 can approach a workpiece W to be picked, without interfering with workpieces W other than the workpiece W. For the interference determination, the height information obtained in Step S704 is used.

Figure 20A:
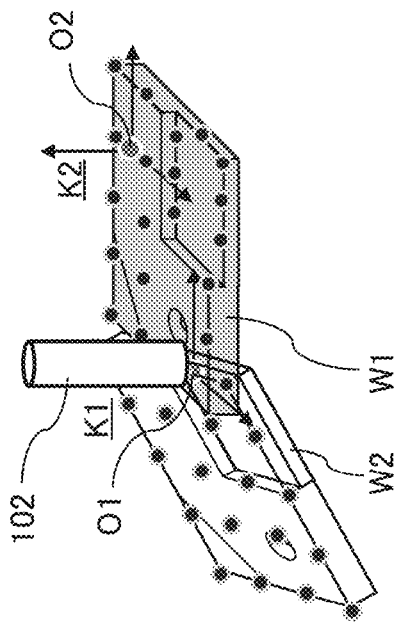
FIG. 20A is a schematic diagram illustrating a state in which two workpieces are overlapping with each other in the seventh embodiment.

FIGS. 20A to 20D virtually and schematically illustrate a state in which a workpiece W1 to be picked and another workpiece W2 are overlapping with each other in the seventh embodiment. For convenience of description, in FIGS. 20A to 20D, the workpiece W2 is illustrated such that the workpiece W1 is seen through the workpiece W2. FIG. 20A illustrates the workpiece W1 detected through the pattern matching process of Step S708, the reference position and posture O0 of the workpiece W1, and the hold-position candidates K1 and K2 at positions and postures O1 and O2. In addition, the other workpiece W2 covers a top portion of the hold-position candidate K1.

Figure 20C:
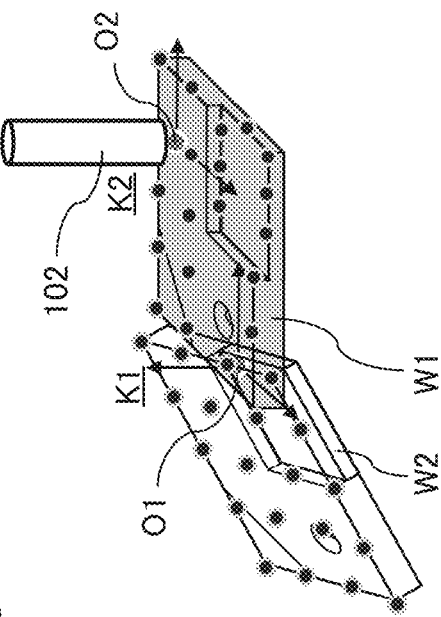
FIG. 20C is a schematic diagram illustrating the state in which the two workpieces are overlapping with each other in the seventh embodiment.
Figure 20B:
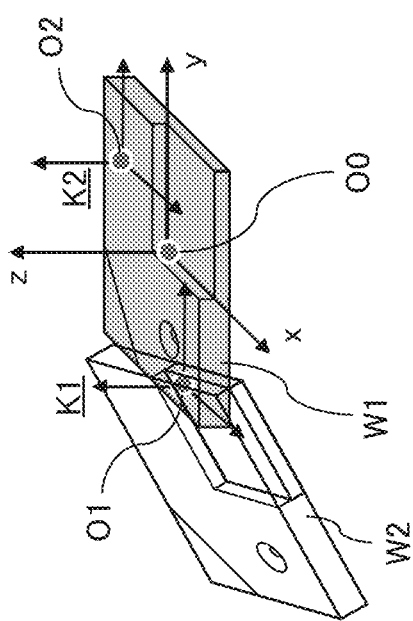
FIG. 20B is a schematic diagram illustrating the state in which the two workpieces are overlapping with each other in the seventh embodiment.
Figure 20D:
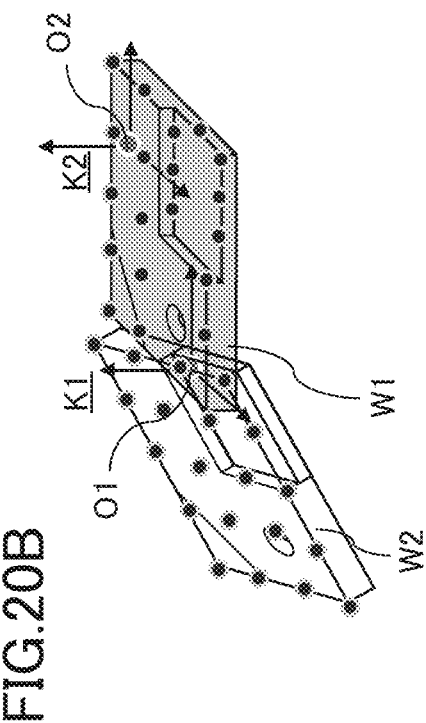
FIG. 20D is a schematic diagram illustrating the state in which the two workpieces are overlapping with each other in the seventh embodiment.

FIG. 20B illustrates heights of the workpieces in the vertical direction, detected in the state of FIG. 20A and expressed as point group information. FIGS. 20C and 20D are diagrams in which a virtual robot hand 102 is disposed. In the state of FIG. 20A, if the workpiece W1 is picked, for example, by using the hold-position candidate K1 that has the position and posture O1, the robot hand 102 will interfere with the workpiece W2, possibly causing the failure of picking the workpiece W1. In addition, since the workpiece W2 is inclined in posture, the robot hand 102 will not successfully hold the workpiece W2, also possibly causing the failure of picking the workpiece W2.

In the state as illustrated in FIG. 20A, the height information obtained in Step S704 can be expressed as a virtual model that indicates point group information on the position and height of the workpieces, as illustrated in FIG. 20B. In this case, the position and posture O1 and the point group information are known. Thus, if the shape information of the robot hand 102 is added to the virtual model, the virtual robot hand 102 can be virtually disposed, as illustrated in FIG. 20C, on the hold-position candidate K1 at the position and posture O1. The shape information of the virtual robot hand 102 refers to the size of the robot hand 102, and the positional information on an abutment plane in which the robot hand 102 abuts against a workpiece. For example, the shape information of the virtual robot hand 102 may be CAD (computer aided design) information of the robot hand 102.

In this manner, whether the virtual robot hand 102 will interfere with the point group of the workpiece W2 can be determined. Similarly, also in a case where the virtual robot hand 102 is disposed on the hold-position candidate K2 at the position and posture O2, whether the robot hand 102 will interfere with the point group of the workpiece W2 can be determined by performing the same process. Thus, in the example illustrated in FIGS. 20A to 20D, it can be determined that at the hold-position candidate K1 at the position and posture O1, the robot hand 102 will interfere with the workpiece W2 other than the workpiece W1 to be picked. In addition, in the example illustrated in FIGS. 20A to 20D, it can be determined that at the hold-position candidate K2 at the position and posture O2, the robot hand 102 can pick the workpiece W1 without interfering with the workpiece W2 other than the workpiece W1 to be picked. In Step S710, the CPU 251 selects a suitable hold-position candidate from among hold-position candidates at which the robot hand 102 will not interfere with the workpiece W2 other than the workpiece W1 to be picked. Then, the robot 100 picks the workpiece W1 in the steps S711 and S712, and conveys the workpiece W1 in Step S713.

As described above, in the seventh embodiment, since the interference determination of Step S709 is added, whether the robot hand 102 will interfere with another workpiece other than a workpiece to be picked can be determined before the robot hand 102 approaches the workpiece. Note that a hold-position candidate that has been determined as a position at which the robot hand 102 will interfere with the workpiece W2 is not selected in the next step S710. Thus, the interference between the robot hand 102 and the workpiece W2 can be avoided, and the robot hand 102 can reliably hold the workpiece W1 that is taking a posture that allows the robot hand 102 to easily pick the workpiece W1. As a result, the success rate of picking workpieces can be increased. Note that one of the seventh embodiment and a modification thereof may be combined with one of the above-described various embodiments and modifications thereof.

Modification

In the above-described seventh embodiment, the interference determination of Step S709 is performed by using the height information obtained in Step S704. However, the interference determination may be performed by using the contour information of a workpiece described in the fifth embodiment. Hereinafter, the interference determination performed by using the contour information will be described in detail.

Figure 21:
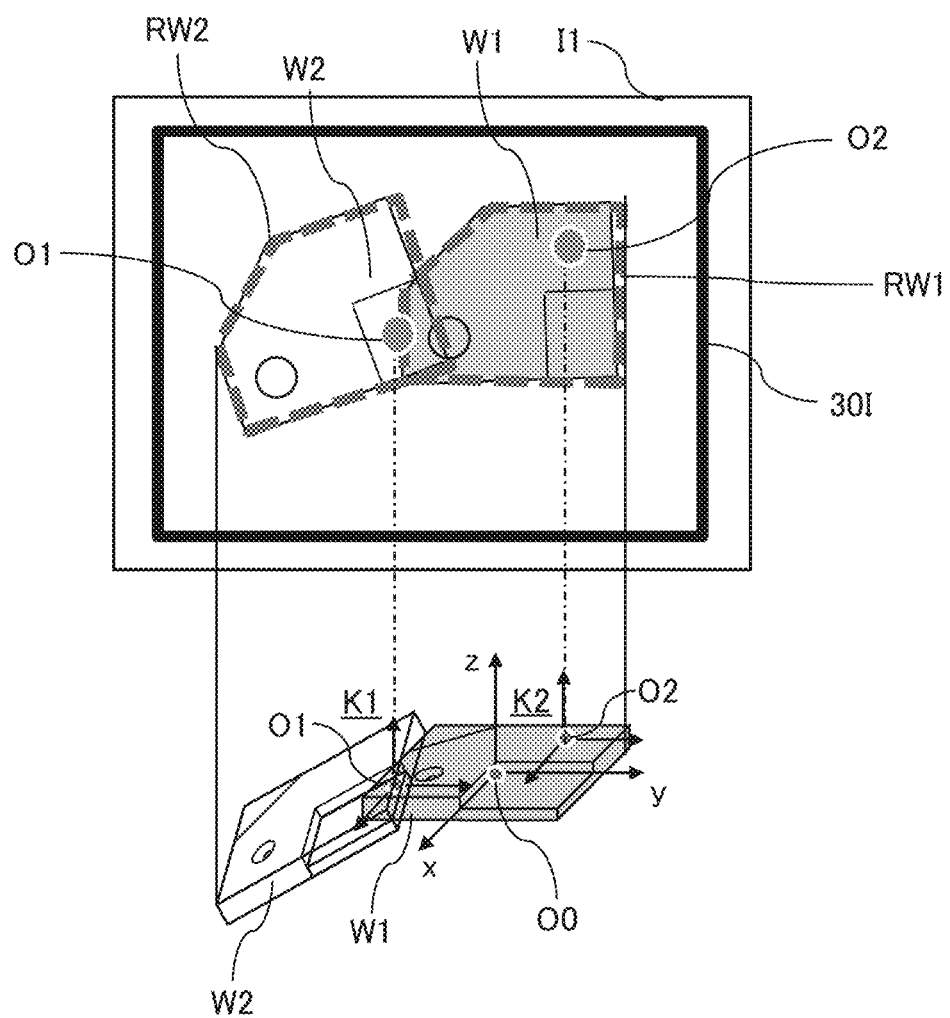
FIG. 21 is a diagram for illustrating interference determination of a modification, performed for the interference between a robot hand and a workpiece.

FIG. 21 illustrates the workpiece W1 detected through the pattern matching process of Step S708, the reference position and posture O0 of the workpiece W1, and the hold-position candidates K1 and K2 at the positions and postures O1 and O2. In addition, the positions and postures O1 and O2 are projected onto the image I1 that indicates areas defined by the contours of workpieces detected in Step S702. An area RW1 is an area defined by the contour of the workpiece W1, and an area RW2 is an area defined by the contour of the workpiece W2. For convenience of description, in FIG. 21, the workpiece W2 is illustrated such that the workpiece W1 is seen through the workpiece W2. The interference determination can be performed by using such a projected image. For example, since the hold-position candidate K1 at the position and posture O1 of the workpiece W1 to be picked is inside the area RW2 defined by the contour of the workpiece W2, the CPU 251 can determine that the robot hand 102 will interfere with the workpiece W2 if the robot hand 102 approaches the hold-position candidate K1. In contrast, since the hold-position candidate K2 at the position and posture O2 of the workpiece W1 to be picked is outside the area RW2, the CPU 251 can determine that the robot hand 102 can pick the workpiece W1 without interfering with the workpiece W2 if the robot hand 102 approaches the hold-position candidate K2.

As described above, in the present modification, since the interference determination of Step S709 is added, whether the robot hand 102 will interfere with another workpiece other than a workpiece to be picked can be determined before the robot hand 102 approaches the workpiece. Note that a hold-position candidate that has been determined as a position at which the robot hand 102 will interfere with another workpiece is not selected in the next step S710. Thus, the interference between the robot hand 102 and the workpiece W2 can be avoided, and the robot hand 102 can reliably hold the workpiece W1 that is taking a posture that allows the robot hand 102 to easily pick the workpiece W1. As a result, the success rate of picking workpieces can be increased. Note that the present modification may be combined with one of the above-described various embodiments and modifications thereof.

The present invention is not limited to the above-described embodiments, and may be variously modified within the technical concept of the present invention. In addition, the effects described in the embodiments are merely the most suitable effects produced by the present invention. Thus, the effects by the present invention are not limited to those described in the embodiments.

In the above-described embodiments, the description has been made for the case where the robot arm 101 is a vertically articulated robot arm. However, the present disclosure is not limited to this. For example, the robot arm may be any one of various robot arms, such as a horizontally articulated robot arm, a parallel link robot arm, and a Cartesian coordinate robot arm. In addition, the mechanism for holding a workpiece may be achieved by a machine that can automatically perform expansion and contraction motion, bending and stretching motion, up-and-down motion, right-and-left motion, pivot motion, or combination motion thereof, depending on information data stored in the storage device of the control device.

In the above-described embodiments, the description has been made for the case where the image processing apparatus 200 and the robot controller 300 are computers separated from each other. However, the present disclosure is not limited to this. For example, the image processing apparatus 200 and the robot controller 300 may be a single computer. In this case, a CPU of the computer may function as the image processing portion and the control portion by executing programs.

In addition, although the description has been made for the case where the image processing apparatus 200 includes the single CPU 251, the present disclosure is not limited to this. For example, the image processing apparatus 200 may include a plurality of CPUs or computers. In this case, the function of the image processing portion may be divided and assigned to the plurality of CPUs or computers.

In addition, although the description has been made, in the above-described embodiments, for the case where the image capture system 400, which is an image capture apparatus, includes the camera 401 that serves as the first image-capture unit and the camera 402 that serves as the second image-capture unit, the present disclosure is not limited to this. For example, if the pattern matching can be performed on a search area of the image I1 obtained by the image capture operation of the camera 401, the camera 402, that is, the image I2 may not be used. In addition, if the images I1 and I2 can be captured by the camera 402 by moving the robot arm 101, the camera 401 may not be disposed. In addition, although the position and posture of a workpiece are measured in the above-described embodiments, only the position or posture of a workpiece may be measured.

Other Embodiment

The present invention can also be achieved by providing a program, which performs one or more functions of the above-described embodiments, to a system or a device via a network or a storage medium, and by one or more processors, which are included in the system or the device, reading and executing the program. In addition, the present invention can also be achieved by using a circuit, such as an ASIC, which performs one or more functions.

The present invention can shorten the time required for the image processing performed for recognizing a workpiece.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-64754, filed Apr. 6, 2021, and Japanese Patent Application No. 2022-33167, filed Mar. 4, 2022, which are hereby incorporated by reference herein in their entirety.

What is claimed is:

1. A robot system comprising:
a robot;
an image capture apparatus;
an image processing portion configured to specify, in an image of a plurality of objects captured by the image capture apparatus, at least one area in which a predetermined object having a predetermined posture exists, and obtain information on position and/or posture of the predetermined object in the at least one area; and
a control portion configured to control the robot, based on the information on position and/or posture of the predetermined object, for the robot to hold the predetermined object,
wherein the image processing portion is configured to perform:
a first capturing process for capturing the plurality of objects and specifying the at least one area in which the predetermined object having the predetermined posture exists, and
a second capturing process to obtain information about the position and/or posture of the predetermined object in the at least one area by capturing a capturing area smaller than a capturing area captured in the first capturing process.

2. The robot system according to claim 1, wherein the image processing portion is configured to determine a posture of a model, based on the predetermined posture, the model being used for obtaining the information on position and/or posture of the predetermined object and configured to indicate a shape of the predetermined object.

3. The robot system according to claim 1, wherein the image processing portion is configured to specify the at least one area by using a learned model on which machine learning has been performed.

4. The robot system according to claim 1, wherein the predetermined posture is a first posture in which an image of a first surface of the predetermined object is captured, or a second posture in which an image of a second surface of the predetermined object different from the first surface is captured.

5. The robot system according to claim 3, wherein the image processing portion is configured to obtain the learned model by using an image obtained by capturing a first surface of an object and/or an image obtained by capturing a second surface of an object different from the first surface of the object.

6. The robot system according to claim 1, wherein the image processing portion is configured to display the at least one area on a display device.

7. The robot system according to claim 1, wherein the image processing portion is configured to display information on a state of the predetermined object on a display device.

8. The robot system according to claim 1, wherein the at least one area is two or more areas, and
wherein the image processing portion is configured to specify the two or more areas and obtain priorities for predetermined objects corresponding to the two or more areas.

9. The robot system according to claim 8, wherein the image processing portion is configured to display the priorities on a display device.

10. The robot system according to claim 8, wherein the image processing portion is configured to obtain the priorities for the predetermined objects corresponding to the two or more areas by using a plurality of factors.

11. The robot system according to claim 10, wherein one of the plurality of factors is a success rate obtained when the robot tried to hold a workpiece in past.

12. The robot system according to claim 10, wherein the plurality of factors includes at least one of an exposure degree of the predetermined objects, a scattering degree of the predetermined objects, and a height of the predetermined objects stacked in bulk.

13. The robot system according to claim 1, wherein the image processing portion is configured to obtain the position and/or the posture of the predetermined object by performing pattern matching on the at least one area.

14. The robot system according to claim 13, wherein the image processing portion is configured to perform the pattern matching on the at least one area and not to perform the pattern matching on another area other than the at least one area.

15. The robot system according to claim 1, wherein the control portion is configured to cause the robot to hold the predetermined object at first that corresponds to the at least one area and that is of the plurality of objects.

16. The robot system according to claim 1, wherein the image processing portion is configured to obtain the information on position and/or posture of the predetermined object by performing pattern matching on an image of the predetermined object captured by the second image-capture unit.

17. The robot system according to claim 1, wherein the second image-capture unit is disposed on the robot.

18. The robot system according to claim 1, wherein the image processing portion is configured to specify the at least one area based on a contour of the predetermined object.

19. The robot system according to claim 18, wherein a plurality of hold positions is set in the predetermined object for the robot to hold the predetermined object, and
    wherein the image processing portion is configured to obtain priorities for the plurality of hold positions based on a state of the predetermined object.

20. The robot system according to claim 19, wherein the image processing portion is configured to obtain the priorities for the plurality of hold positions based on at least one of a height of each of the plurality of hold positions of the predetermined object stacked in bulk, a center of gravity of the predetermined object, and a time necessary for the robot to approach each of the plurality of hold positions of the predetermined object.

21. The robot system according to claim 1, wherein a plurality of hold positions is set in the predetermined object for the robot to hold the object, and
    wherein the image processing portion is configured to specify a hold position of the plurality of hold positions that causes the robot to interfere with another object other than the predetermined object when the robot holds the predetermined object.

22. The robot system according to claim 21, wherein the image processing portion is configured to determine whether the robot will interfere with the other object other than the predetermined object based on a height of the predetermined object, a height of the other object other than the predetermined object, and/or a contour of the predetermined object and a contour of the other object other than the predetermined object.

23. A control method of a robot system that includes a robot and an image capture apparatus, the method comprising:
    specifying, by an image processing portion, in an image of a plurality of objects captured by the image capture apparatus, at least one area in which a predetermined object having a predetermined posture exists, and obtaining, by the image processing portion, information on position and/or posture of the predetermined object in the at least one area; and
    controlling, by a control portion, the robot based on the information on position and/or posture of the object, for the robot to hold the predetermined object,
    wherein the image processing portion performs:
        a first capturing process of capturing the plurality of objects and specifying the at least one area in which the predetermined object having the predetermined posture exists, and
        a second capturing process of obtaining information about the position and/or posture of the predetermined object in the at least one area by capturing a capturing area smaller than a capturing area captured in the first capturing process.

24. An image processing apparatus comprising:
    an image processing portion configured to specify in a captured image of a plurality of objects, at least one area in which a predetermined object having a predetermined posture exists, and obtain information on position and/or posture of the predetermined object in the at least one area,
    the image processing portion is configured to perform:
        a first capturing process for capturing the plurality of objects and specifying the at least one area in which the predetermined object having the predetermined posture exists, and
        a second capturing process to obtain information about the position and/or posture of the predetermined object in the at least one area by capturing a capturing area smaller than a capturing area captured in the first capturing process.

25. An image processing method comprising:
    specifying, by an image processing portion, in a captured image of a plurality of objects, at least one area in which a predetermined object having a predetermined posture exists; and
    obtaining, by the image processing portion, information on position and/or posture of the predetermined object in the area,
    wherein the image processing portion performs:
        a first capturing process for capturing the plurality of objects and specifying the at least one area in which the predetermined object having the predetermined posture exists, and
        a second capturing process to obtain information about the position and/or posture of the predetermined object in the at least one area by capturing a capturing area smaller than a capturing area captured in the first capturing process.

26. A method of manufacturing products by using the robot system according to claim 1.

27. A computer-readable non-transitory recording medium storing a program that causes a computer to perform the control method according to claim 23.

28. A computer-readable non-transitory recording medium storing a program that causes a computer to perform the image processing method according to claim 25.

* * * * *